US011194346B2

(12) United States Patent
Katsuki

(10) Patent No.: US 11,194,346 B2
(45) Date of Patent: Dec. 7, 2021

(54) ANGULAR SPEED ACQUISITION DEVICE FOR ACQUIRING ANGULAR SPEED ABOUT ROAD SURFACE PERPENDICULAR AXIS OF LEANING VEHICLE

(71) Applicant: YAMAHA HATSUDOKI KABUSHIKI KAISHA, Iwata (JP)

(72) Inventor: Kenji Katsuki, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 237 days.

(21) Appl. No.: 16/425,408

(22) Filed: May 29, 2019

(65) Prior Publication Data

US 2019/0278300 A1   Sep. 12, 2019

Related U.S. Application Data

(63) Continuation-in-part of application No. PCT/JP2017/042431, filed on Nov. 27, 2017.

(30) Foreign Application Priority Data

Nov. 29, 2016 (JP) .............................. JP2016-231408

(51) Int. Cl.
*G05D 1/08* (2006.01)
*G01P 3/44* (2006.01)
(Continued)

(52) U.S. Cl.
CPC ............ *G05D 1/0891* (2013.01); *B62J 99/00* (2013.01); *G01P 3/44* (2013.01); *B60W 40/105* (2013.01);
(Continued)

(58) Field of Classification Search
CPC .............. G05D 1/0891; B60W 40/105; B60W 40/112; B60W 2520/18; B60W 2300/36;
(Continued)

(56) References Cited

U.S. PATENT DOCUMENTS 5,547,382 A * 8/1996 Yamasaki ................ G09B 9/05
273/442
5,930,739 A * 7/1999 Constancis ........... G01S 17/931
702/145

(Continued)

FOREIGN PATENT DOCUMENTS

| DE | 102012222765 A1 | 6/2014 |
|---|---|---|
| DE | 102015204389 A1 | 9/2016 |
| EP | 2595830 A1 | 5/2013 |
| JP | 2015-077824 A | 4/2015 |
| JP | 2015-209106 A | 11/2015 |

*Primary Examiner* — Tyler J Lee
*Assistant Examiner* — Yufeng Zhang
(74) *Attorney, Agent, or Firm* — Rabin & Berdo, P.C.

(57) ABSTRACT

An angular speed acquisition device acquires the angular speed about a road surface perpendicular axis of a leaning vehicle. The leaning vehicle includes a vehicle body frame capable of leaning in a vehicle left-right direction and a steering shaft which steers at least one of a front wheel unit and a rear wheel unit. An angular speed acquisition device, which is mountable on the leaning vehicle, includes a memory and a processor. The memory stores the relationship between the steering angle, which is a rotation angle about the rotational axis of the steering shaft, the vehicle speed of the leaning vehicle, and the angular speed ω about the road surface perpendicular axis.

7 Claims, 19 Drawing Sheets

(51) Int. Cl.
*B62J 99/00* (2020.01)
*B60W 40/105* (2012.01)
*B60W 40/112* (2012.01)
*G01C 9/18* (2006.01)
*B62J 45/40* (2020.01)

(52) U.S. Cl.
CPC ....... *B60W 40/112* (2013.01); *B60W 2520/18* (2013.01); *B62J 45/40* (2020.02); *G01C 9/18* (2013.01)

(58) Field of Classification Search
CPC ...... B60W 2540/18; B60W 2050/0026; B62K 11/00; B62J 99/00; G01P 3/44; G01C 9/18
USPC .......................................................... 701/41
See application file for complete search history.

(56) References Cited

U.S. PATENT DOCUMENTS

| | | | | |
|---|---|---|---|---|
| 7,822,575 | B2* | 10/2010 | Suzuki | G01C 9/00 |
| | | | | 702/151 |
| 8,050,820 | B2* | 11/2011 | Yanaka | B60G 17/0161 |
| | | | | 701/37 |
| 10,549,778 | B2* | 2/2020 | Kim | B62D 5/0466 |
| 2007/0067085 | A1 | 3/2007 | Lu et al. | |
| 2014/0188341 | A1 | 7/2014 | Takenaka et al. | |
| 2015/0105938 | A1 | 4/2015 | Seki | |
| 2015/0308827 | A1 | 10/2015 | Fujii | |
| 2017/0080769 | A1* | 3/2017 | Kurita | B60G 17/08 |
| 2017/0343352 | A1 | 11/2017 | Schulz | |

\* cited by examiner

GAIN RATIO OF ANGULAR SPEED ABOUT ROAD SURFACE PERPENDICULAR AXIS TO STEERING ANGLE [dB]

FREQUENCIES [s⁻¹]

PHASE DIFFERENCE BETWEEN ANGULAR SPEED ABOUT ROAD SURFACE PERPENDICULAR AXIS AND STEERING ANGLE [deg]

FREQUENCIES [s⁻¹]

|  |  | VEHICLE SPEEDS[km/h] | | | | |
|---|---|---|---|---|---|---|
|  |  | V1 | V2 | V3 | V5 | V7 |
| CIRCLES | C1 | ○ | ○ | ○ |  |  |
|  | C2 | ○ | ○ | ○ |  |  |
|  | C3 | ○ | ○ | ○ |  |  |
|  | C4 |  | ○ | ○ | ○ |  |
|  | C5 |  |  | ○ | ○ | ○ |
|  | C6 |  |  | ○ | ○ | ○ |

FIG.19A

VEHICLE SPEED V

| STEERING ANGLE \ VEHICLE SPEED | 0 | V11 | V12 | V13 |
|---|---|---|---|---|
| 0 | $\omega 00$ | $\omega 01$ | $\omega 02$ | $\omega 03$ |
| S11 | $\omega 10$ | $\omega 11$ | $\omega 12$ | $\omega 13$ |
| S12 | $\omega 20$ | $\omega 21$ | $\omega 22$ | $\omega 23$ |
| S13 | $\omega 30$ | $\omega 31$ | $\omega 32$ | $\omega 33$ |

STEERING ANGLE S

ANGULAR SPEED $\omega$ ABOUT ROAD SURFACE PERPENDICULAR AXIS

FIG.19B

VEHICLE SPEED V

| STEERING ANGLE \ VEHICLE SPEED | 0 | V11 | V12 | V13 |
|---|---|---|---|---|
| 0 | $\theta 00$ | $\theta 01$ | $\theta 02$ | $\theta 03$ |
| S11 | $\theta 10$ | $\theta 11$ | $\theta 12$ | $\theta 13$ |
| S12 | $\theta 20$ | $\theta 21$ | $\theta 22$ | $\theta 23$ |
| S13 | $\theta 30$ | $\theta 31$ | $\theta 32$ | $\theta 33$ |

STEERING ANGLE S

LEFT-RIGHT DIRECTION INCLINATION ANGLE $\theta$

ANGULAR SPEED ACQUISITION DEVICE FOR ACQUIRING ANGULAR SPEED ABOUT ROAD SURFACE PERPENDICULAR AXIS OF LEANING VEHICLE

CROSS-REFERENCE TO RELATED APPLICATIONS

This application claims the benefit of the earlier filing date of International Application No. PCT/JP2017/042431, filed on Nov. 27, 2017, and of Japanese Patent Application No. 2016-231408, filed on Nov. 29, 2016. The entire contents of each of the identified applications are incorporated herein by reference.

BACKGROUND

Technical Field

The present invention relates to angular speed acquisition device which is configured to acquire angular speed of a leaning vehicle about a road surface perpendicular axis which is an axis perpendicular to the road surface on which the leaning vehicle runs.

Background Art

A leaning vehicle including a yaw rate sensor has been known. The leaning vehicle is a vehicle which includes a vehicle body frame structured to lean rightward when turning right and lean leftward when turning left. Patent Literature 1 recites an example of the leaning vehicle including the yaw rate sensor. The yaw rate sensor is fixed to the vehicle body frame of the leaning vehicle. The axis of the vehicle body frame, which is along the vehicle up-down direction when the leaning vehicle is in an upright state, is a fixed axis of the vehicle body frame. The fixed axis of the vehicle body frame is an axis fixed to the vehicle body frame of the leaning vehicle. In other words, the central axis of angular speed detected by the yaw rate sensor is the fixed axis of the vehicle body frame. The yaw rate sensor of the leaning vehicle detects angular speed of the vehicle body frame about the fixed axis.

When the vehicle body frame leans in the vehicle left-right direction, the fixed axis of the vehicle body frame leans in the vehicle left-right direction, too. In other words, the central axis of the angular speed detected by the yaw rate sensor also leans in the vehicle left-right direction. On this account, correction by using a roll angle is required to calculate the angular speed of the leaning vehicle about the road surface perpendicular axis based on a signal from the yaw rate sensor. The roll angle is an angle of inclination of the fixed axis of the vehicle body frame when the fixed axis leans in the vehicle left-right direction relative to the road surface perpendicular direction. To put it differently, the central axis of the angular speed detected by the yaw rate sensor is converted to the road surface perpendicular axis by using the roll angle, and then the angular speed of the leaning vehicle about the road surface perpendicular axis is calculated.

CITATION LIST

Patent Literatures

[Patent Literature 1] Japanese Unexamined Patent Publication No. 2015-77824

SUMMARY

In order to estimate the roll angle, a roll angle sensor is used. The roll angle sensor is fixed to the vehicle body frame of the leaning vehicle. The roll angle sensor acquires an angle of inclination of the fixed axis of the vehicle body frame when the fixed axis leans in the vehicle left-right direction relative to the road surface perpendicular direction. The roll angle sensor estimates the roll angle based on the acceleration and roll angle speed in the road surface perpendicular direction of the leaning vehicle. The calculation for estimating the roll angle is therefore complicated. Accordingly, the calculation of the angular speed of the leaning vehicle about the road surface perpendicular axis based on a signal from the yaw rate sensor is complicated.

An object of the present teaching is to provide angular speed acquisition device of acquiring angular speed about a road surface perpendicular axis of a leaning vehicle, which is able to easily acquire the angular speed about the road surface perpendicular axis of the leaning vehicle.

Solution to Problem

The inventors of the subject application tried to find an easy way to acquire the angular speed about the road surface perpendicular axis of the leaning vehicle. To do so, the inventors of the subject application considered a state in which the angular speed about the road surface perpendicular axis of the leaning vehicle was constant while the vehicle body frame leaned leftward or rightward. The inventors found that the angular speed and the steering angle about the road surface perpendicular axis of the leaning vehicle were constant when the leaning vehicle ran on a circle at particular constant vehicle speed. The inventors measured the angular speed and steering angle about the road surface perpendicular axis of the leaning vehicle with differently-sized circles and different constant vehicle speeds on the circles. Based on a result of this measurement, the inventors found that the vehicle speed, the steering angle, and the angular speed about the road surface perpendicular axis of the leaning vehicle have certain relationship. The inventors then found that the angular speed about the road surface perpendicular axis of the leaning vehicle was determined from the vehicle speed and the steering angle.

[1] An angular speed acquisition device of the present teaching is mountable on a leaning vehicle and is configured to acquire angular speed of the leaning vehicle about a road surface perpendicular axis which is an axis perpendicular to a road surface on which the leaning vehicle runs, the leaning vehicle including: a vehicle body frame which leans rightward when turning right and leans leftward when turning left; a front wheel unit which is supported by the vehicle body frame and includes at least one front wheel; a rear wheel unit which is provided behind the front wheel unit in a vehicle front-rear direction, is supported by the vehicle body frame, and includes at least one rear wheel; and at least one steering shaft steering at least one of the front wheel unit or the rear wheel unit.

The angular speed acquisition device includes: a memory which is configured to store relationship between a steering angle which is a rotation angle about a rotational axis of the at least one steering shaft, vehicle speed of the leaning vehicle, and angular speed about the road surface perpendicular axis in advance; and a processor which is configured to or programmed to execute: (a) a steering angle acquisition process of acquiring a signal related to the steering angle which is the rotation angle about the rotational axis of the at least one steering shaft as a steering angle signal; (b) a vehicle speed acquisition process of acquiring a signal related to the vehicle speed of the leaning vehicle as a vehicle speed signal; and (c) a road surface perpendicular axis angular speed acquisition process of acquiring the angular speed about the road surface perpendicular axis based on the relationship between the steering angle, the vehicle speed, and the angular speed about the road surface perpendicular axis stored in the storage unit, the steering angle signal acquired by the steering angle acquisition unit, and the vehicle speed signal acquired by the vehicle speed acquisition unit.

According to this arrangement, the angular speed acquisition device for acquiring angular speed about the road surface perpendicular axis of the leaning vehicle acquires the angular speed about the road surface perpendicular axis of the leaning vehicle. The road surface perpendicular axis is an axis which is perpendicular to the road surface on which the leaning vehicle runs. The angular speed acquisition device for acquiring angular speed about the road surface perpendicular axis of the leaning vehicle can be mounted on the leaning vehicle. The leaning vehicle includes the vehicle body frame, the front wheel unit, the rear wheel unit, and the at least one steering shaft. The front wheel unit includes at least one front wheel. The rear wheel unit includes at least one rear wheel. The vehicle body frame is structured to lean rightward when turning right and lean leftward when turning left. The front wheel unit is supported by the vehicle body frame. The rear wheel unit is provided rearward of the front wheel unit in the vehicle front-rear direction. The rear wheel unit is supported by the vehicle body frame. The steering shaft steers at least one of the front wheel unit or the rear wheel unit.

The angular speed acquisition device for acquiring angular speed about the road surface perpendicular axis of the leaning vehicle includes the memory and the processor. The memory stores the relationship between steering angle which is a rotation angle about the rotational axis of the steering shaft, vehicle speed of the leaning vehicle, and angular speed about the road surface perpendicular axis in advance. The relationship between steering angle, vehicle speed, and angular speed about the road surface perpendicular axis may be stored as a voltage signal detected by a sensor or the like, or may be stored as a value. The processor is configured or programmed to execute the steering angle acquisition process, the vehicle speed acquisition process, and the road surface perpendicular axis angular speed acquisition process. In the steering angle acquisition process, a signal related to a steering angle which is a rotation angle about the rotational axis of the steering shaft is acquired as a steering angle signal. In the vehicle speed acquisition process, a signal related to vehicle speed of the leaning vehicle is acquired as a vehicle speed signal. In the road surface perpendicular axis angular speed acquisition process, angular speed about the road surface perpendicular axis is acquired based on the relationship between steering angle, vehicle speed, and angular speed about the road surface perpendicular axis stored in the memory, the steering angle signal, and the vehicle speed signal. Because the memory stores the relationship between steering angle, vehicle speed, and angular speed about the road surface perpendicular axis, the angular speed about the road surface perpendicular axis is acquired when the steering angle and the vehicle speed are determined. The processor is able to easily acquire the steering angle signal and the vehicle speed signal. To put it differently, in the road surface perpendicular axis angular speed acquisition process, it is easy to acquire the angular speed about the road surface perpendicular axis, based on the steering angle signal and the vehicle speed signal which can be easily acquired. The angular speed acquisition device for acquiring angular speed about the road surface perpendicular axis of the leaning vehicle is therefore able to easily acquire the angular speed about the axis perpendicular to the road surface of the leaning vehicle.

The angular speed about the road surface perpendicular axis of the leaning vehicle acquired by the angular speed acquisition device is output to an output target such as a controller controlling the leaning vehicle or a riding simulator of the leaning vehicle. The angular speed about the road surface perpendicular axis of the leaning vehicle acquired by the angular speed acquisition device is easily utilized after being output to an output target. To be more specific, the output angular speed about the road surface perpendicular axis of the leaning vehicle is, at the output target, easily utilized for controlling the leaning vehicle and analyzing the running state of the leaning vehicle, for example. Because the post-processing of the output angular speed about the road surface perpendicular axis of the leaning vehicle can be easily done, the hardware resource of the output target to which the angular speed about the road surface perpendicular axis of the leaning vehicle is output can be reduced.

[2] According to another aspect of the present teaching, the angular speed acquisition device for acquiring angular speed about the road surface perpendicular axis of the leaning vehicle of the present teaching preferably includes the following arrangement in addition to the arrangement [1] above.

The memory stores the relationship between the steering angle, the vehicle speed, and the angular speed about the road surface perpendicular axis as a table determined by the steering angle and the angular speed about the road surface perpendicular axis, which are acquired when the leaning vehicle runs on circles with different sizes at different constant vehicle speeds.

According to this arrangement, the memory stores the relationship between steering angle, vehicle speed, and angular speed about the road surface perpendicular axis as a table. When the leaning vehicle runs along a circle at constant vehicle speed, the steering angle and the angular speed about the road surface perpendicular axis are arranged to be constant. As the size of the circle and the constant vehicle speed of the leaning vehicle are changed, it is possible to acquire steering angles and the angular speeds about the road surface perpendicular axis. The table is determined by the steering angles and the angular speeds about the road surface perpendicular axis, which are acquired by causing the leaning vehicle to run along circles with different sizes at different constant vehicle speeds. The angular speed acquisition device for acquiring angular speed about the road surface perpendicular axis of the leaning vehicle is therefore able to acquire the angular speed about the axis in the direction perpendicular to the road surface of the leaning vehicle, based on the table and the acquired vehicle speed signal and steering angle signal. The angular speed acquisition device for acquiring angular speed about the road surface perpendicular axis of the leaning vehicle is therefore able to easily acquire the angular speed about the axis perpendicular to the road surface of the leaning vehicle.

In the present teaching, the relationship between steering angle, vehicle speed, and angular speed about the road surface perpendicular axis is not limited to a table in which the relationship between steering angle and angular speed about the road surface perpendicular axis is indicated by a line for each vehicle speed. The relationship between steering angle, vehicle speed, and angular speed about the road surface perpendicular axis is, for example, indicated by a table in which angular speeds about the road surface perpendicular axis, which correspond to plural vertical speeds and steering angles, are tabularized.

[3] According to another aspect of the present teaching, the angular speed acquisition device for acquiring angular speed about the road surface perpendicular axis of the leaning vehicle of the present teaching may include the following arrangement in addition to the arrangement [1] or [2] above. The memory is configured to further store relationship between the steering angle, the vehicle speed, and an inclination angle in a left-right direction, which is an angle at which an axis of the vehicle body frame along a vehicle up-down direction when the leaning vehicle is in an upright state is inclined in a vehicle left-right direction relative to a road surface perpendicular direction, and the processor is further configured or programmed to acquire the inclination angle in the left-right direction based on the relationship between the steering angle, the vehicle speed, and the inclination angle in the left-right direction stored in the memory, the steering angle signal, and the vehicle speed signal.

According to this arrangement, the memory further stores the relationship between steering angle, vehicle speed, and inclination angle in the left-right direction in advance. The relationship between a steering angle, vehicle speed, and inclination angle in the left-right direction may be stored as a voltage signal detected by a sensor or the like, or may be stored as a value. The inclination angle in the left-right direction is an angle of inclination of the fixed axis of the vehicle body frame when the fixed axis leans in the vehicle left-right direction relative to the road surface perpendicular direction. The fixed axis of the vehicle body frame is an axis along the vehicle up-down direction when the leaning vehicle is in the upright state. The fixed axis of the vehicle body frame is an axis fixed to the vehicle body frame of the leaning vehicle. The processor is further configured to or programmed to execute the left-right direction inclination angle acquisition process. In the left-right direction inclination angle acquisition process, an inclination angle in the left-right direction is acquired based on the relationship between steering angle, vehicle speed, and inclination angle in the left-right direction stored in the memory, the steering angle signal, and the vehicle speed signal. The angular speed acquisition device for acquiring angular speed about the road surface perpendicular axis of the leaning vehicle is therefore able to acquire an inclination angle in the vehicle left-right direction relative to the road surface perpendicular direction of the fixed axis of the vehicle body frame, based on the relationship between steering angle, vehicle speed, and inclination angle in the left-right direction, the vehicle speed signal, and the steering angle signal. When the leaning vehicle is in the upright state, the fixed axis of the vehicle body frame passes a predetermined part of the vehicle body frame such as the center of gravity of the leaning vehicle, and is parallel to the vehicle up-down direction. The inclination angle in the vehicle left-right direction of the fixed axis of the vehicle body frame relative to the road surface perpendicular direction is a roll angle of the leaning vehicle.

The inclination angle in the left-right direction of the leaning vehicle, which is acquired by the angular speed acquisition device for acquiring angular speed about the road surface perpendicular axis of the leaning vehicle, is output to an output target such as a controller controlling the leaning vehicle or a riding simulator of the leaning vehicle. The inclination angle in the left-right direction of the leaning vehicle, which is acquired by the angular speed acquisition device for acquiring angular speed about the road surface perpendicular axis of the leaning vehicle, is easily utilized after being output to an output target. To be more specific, the output inclination angle in the left-right direction is, at the output target, easily utilized for controlling the leaning vehicle and analyzing the running state of the leaning vehicle, for example. Because the post-processing of the output inclination angle in the left-right direction can be easily done, the hardware resource of the output target to which the inclination angle in the left-right direction is output can be reduced.

[4] According to another aspect of the present teaching, the angular speed acquisition device for acquiring angular speed about the road surface perpendicular axis of the leaning vehicle of the present teaching preferably includes the following arrangement in addition to the arrangement [3] above. The memory stores the relationship between the steering angle, the vehicle speed, and the inclination angle in the left-right direction as a table determined by the steering angle and the inclination angle in the left-right direction, which are acquired when the leaning vehicle runs on circles with different sizes at different constant vehicle speeds.

According to this arrangement, the memory stores the relationship between steering angle, vehicle speed, and inclination angle in the left-right direction as a table. When the leaning vehicle runs along a circle at constant vehicle speed, the steering angle and the inclination angle in the left-right direction are arranged to be constant. As the size of the circle and the constant vehicle speed of the leaning vehicle are changed, it is possible to acquire steering angles and inclination angles in the left-right direction. The table is determined by the steering angles and the inclination angles in the left-right direction, which are acquired by causing the leaning vehicle to run along circles with different sizes at different constant vehicle speeds. The angular speed acquisition device for acquiring angular speed about the road surface perpendicular axis of the leaning vehicle is therefore able to acquire the angle at which the fixed axis of the vehicle body frame is inclined in the vehicle left-right direction relative to the road surface perpendicular direction, based on the table, the vehicle speed signal, and the steering angle signal.

In the present teaching, the relationship between steering angle, vehicle speed, and inclination angle in the left-right direction is, for example, stored as a table in which the relationship between steering angle, vehicle speed, and inclination angle in the left-right direction is indicated by a line for each vehicle speed. Furthermore, the relationship between steering angle, vehicle speed, and inclination angle in the left-right direction is, for example, indicated by a table in which inclination angles in the left-right direction, which correspond to plural vehicle speeds and plural steering angles, are tabularized.

[5] According to another aspect of the present teaching, the angular speed acquisition device for acquiring angular speed about the road surface perpendicular axis of the leaning vehicle of the present teaching preferably includes the following arrangement in addition to any one of the arrangements [1] to [4] above.

The angular speed acquisition device for acquiring angular speed about the road surface perpendicular axis of the leaning vehicle is applicable to a controller which controls the leaning vehicle or a riding simulator of the leaning vehicle.

According to this arrangement, the angular speed acquisition device for acquiring angular speed about the road surface perpendicular axis of the leaning vehicle of the present teaching is applicable to the controller which controls the leaning vehicle or the riding simulator of the leaning vehicle. The angular speed about the road surface perpendicular axis of the leaning vehicle acquired by the angular speed acquisition device is output to an output target including a controller controlling the leaning vehicle and a riding simulator of the leaning vehicle. The inclination angle in the left-right direction of the leaning vehicle, which is acquired by the angular speed acquisition device for acquiring angular speed about the road surface perpendicular axis of the leaning vehicle, is output to an output target including a controller controlling the leaning vehicle and a riding simulator of the leaning vehicle. The output target may or may not be included in the angular speed acquisition device which acquires angular speed about the road surface perpendicular axis of the leaning vehicle.

The following will describe a case where the output target is the controller controlling the leaning vehicle. The angular speed about the road surface perpendicular axis of the leaning vehicle acquired by the angular speed acquisition device is used for the following object, for example. The controller may, for example, calculate the angle about the road surface perpendicular axis by integrating the acquired angular speed about the road surface perpendicular axis with a predetermined time. The angle about the road surface perpendicular axis is a variation in the traveling direction of the leaning vehicle per the predetermined time. The controller may estimate a location after the predetermined time elapses, based on the angle about the road surface perpendicular axis, the vehicle speed, and the current location of the leaning vehicle. The controller may, for example, use the calculated angle about the road surface perpendicular axis for changing the illumination angle of a headlight of the leaning vehicle. In this case, when the leaning vehicle is turning, the controller changes the illumination angle of the headlight to the calculated angle about the road surface perpendicular axis. Furthermore, the controller may, for example, use the acquired inclination angle in the left-right direction for controlling the engine, the brake, and/or the transmission. To be more specific, the controller may use the acquired angular speed about the road surface perpendicular axis for a stability control system of the leaning vehicle. In this case, when the leaning vehicle is turning, the controller changes an engine output of the leaning vehicle based on the calculated angle about the road surface perpendicular axis. Meanwhile, the inclination angle in the left-right direction of the leaning vehicle, which is acquired by the angular speed acquisition device for acquiring angular speed about the road surface perpendicular axis of the leaning vehicle, is used for the following object for example. The controller may, for example, use the acquired inclination angle in the left-right direction for controlling the engine, the brake, and/or the transmission. Furthermore, for example, the controller may use the acquired inclination angle in the left-right direction for controlling a leaning mechanism connecting two front wheels in a leaning vehicle in which the front wheel unit has two front wheels.

The following will describe a case where the output target is the simulator of the leaning vehicle. Leaning vehicles are greatly influenced by driving operations of drivers as compared to other types of vehicles. For this reason, when one tries to introduce recent drive assist technologies, mechanisms such as cognition, decision, operation of drivers must be clarified, and a system having a high affinity with drivers is required. A method of evaluating the drive assist technologies for leaning vehicles with reproducibility is a riding simulator of a leaning vehicle. A known riding simulator of a leaning vehicle has been mainly used for analyzing actions of a leaning vehicle. The known riding simulator of the leaning vehicle utilizes a leaning vehicle model in which running states of the leaning vehicle are modeled. In the known riding simulator of the leaning vehicle, a steering torque of the driver and an inclination angle in the left-right direction are used as inputs to the leaning vehicle model, and these inputs are fed back to the running state. The known riding simulator of the leaning vehicle was developed as an apparatus for simulating running states peculiar to leaning vehicles, such as slalom running and high-speed turning. Meanwhile, in low-speed turning such as turning right or left, the running state of the leaning vehicle changes in the known riding simulator of the leaning vehicle. The low speed is, for example, 10 km/h to 20 km/h. Typically, when a driver drives a leaning vehicle, a reverse steering torque termed counter steering is input. This counter steering, however, is unconsciously done by the driver. The driver is conscious about a steering action in the direction in which the leaning vehicle leans, which is caused by the counter steering. Meanwhile, in the known riding simulator of the leaning vehicle in which a steering torque is used as an input, the leaning vehicle does not lean in response to counter steering unconsciously done by the driver. For this reason, a lot of practice is disadvantageously required for the driver to get used to the operations of the known riding simulator of the leaning vehicle. Under this circumstance, the inventors of the subject application have found that drivers quickly get used to operations of the riding simulator of the leaning vehicle when the riding simulator of the leaning vehicle satisfies the following three requirements. Firstly, the leaning vehicle is able to lean and turn even at low speed. Secondly, the dynamics of the leaning vehicle are taken into account. Thirdly, a simulated body of the leaning vehicle of the riding simulator does not move in the vehicle left-right direction when the simulated body is steered. To satisfy these requirements, the angular speed acquisition device for acquiring angular speed about the road surface perpendicular axis of the leaning vehicle of the present teaching, which is applied to the riding simulator, utilizes a steering compatible model which assumes that steering is performed in the same direction as the traveling direction that the driver wishes. The steering compatible model assumes that the angular speed about the road surface perpendicular axis and the inclination angle in the left-right direction are not delayed from the steering angle. In the steering compatible model, the modeling is done with the assumption that the angular speed about the road surface perpendicular axis and the inclination angle in the left-right direction are uniquely determined when the vehicle speed and the steering angle are determined. The riding simulator of the leaning vehicle of the present teaching, to which the angular speed acquisition device for acquiring angular speed about the road surface perpendicular axis of the leaning vehicle of the present teaching is applied, is able to easily acquire angular speed about the road surface perpendicular axis and an inclination angle in the left-right direction, by utilizing the steering angle and the vehicle speed as inputs. In other words, the angular speed about the road surface perpendicular axis of the leaning vehicle and the inclination angle in the left-right direction, which are acquired by the angular speed acquisition device for acquiring angular speed about the road surface perpendicular axis of the leaning vehicle, are used for analyzing the running state of the leaning vehicle. This allows the driver to quickly get used to the operations of the riding simulator of the leaning vehicle.

As such, the angular speed about the road surface perpendicular axis of the leaning vehicle and the inclination angle in the left-right direction, which are acquired by the angular speed acquisition device for acquiring angular speed about the road surface perpendicular axis of the leaning vehicle, are easily utilized after being output to an output target which is the controller which controls the leaning vehicle or the riding simulator of the leaning vehicle. To be more specific, the output angular speed about the road surface perpendicular axis of the leaning vehicle and the output inclination angle in the left-right direction are, at the output target, easily utilized for controlling the leaning vehicle and analyzing the running state of the leaning vehicle, for example. Because the angular speed about the road surface perpendicular axis of the leaning vehicle and the inclination angle in the left-right direction can be easily utilized, post-processing of the output angular speed about the road surface perpendicular axis of the leaning vehicle and the output inclination angle in the left-right direction can be easily done. Because the post-processing of the output angular speed about the road surface perpendicular axis of the leaning vehicle and the output inclination angle in the left-right direction can be easily done, the hardware resource of the output target to which the angular speed about the road surface perpendicular axis of the leaning vehicle and the output inclination angle in the left-right direction are output can be reduced.

<Definitions of Detection and Acquisition>

In the present teaching, the terms "detection" and "acquisition" are basically used in accordance with the following rules.

(1) "Detection of a physical quantity a" indicates acquisition of information indicating a physical quantity a (measured value) by measuring the physical quantity a.

(2) "Acquisition of a physical quantity a" encompasses "detection of a physical quantity a" and determination of a physical quantity a based on information detected by a sensor or the like.

"Acquisition" includes, for example, the following actions:

(2.1) Calculation of a physical quantity a by substituting a measured value in a predetermined arithmetic expression;

(2.2) Reading of a physical quantity a corresponding to a measured value from a table (including database) which indicates the correspondence between measured values and the physical quantities a; and (2.3) Estimation of the physical quantity a based on a measured value.

<Definitions of Vehicle Up-Down Direction, Vehicle Left-Right Direction, and Vehicle Front-Rear Direction>

In the present teaching, a vehicle front-rear direction of a leaning vehicle is a front-rear direction for a driver seated on a seat of the leaning vehicle. A vehicle left-right direction of the leaning vehicle is a left-right direction for the driver seated on the seat of the leaning vehicle. The vehicle front-rear direction and the vehicle left-right direction are directions parallel to the road surface. A traveling direction of the leaning vehicle is close to the vehicle front-rear direction of the leaning vehicle but does not always coincide with the vehicle front-rear direction. A vehicle up-down direction of the leaning vehicle is identical with a road surface perpendicular direction of the leaning vehicle.

<Definition of Processor>

In the present teaching, "processor" encompasses a micro controller, a CPU (Central Processing Unit), a GPU (Graphics Processing Unit), a microprocessor, an application specific integrated circuit (ASIC), a programmable logic circuit (PLC), a field programmable gate array (FPGA), and other types of circuits capable of executing processes described in the present teaching.

<Definition of Memory>

In the present teaching, "memory" encompasses storage devices storing various types of data, such as a ROM (Read Only Memory), a RAM (Random Access Memory), and a hard disk. The RAM temporarily stores various types of data when the processor executes a program, for example. The ROM stores programs executed by the processor, for example.

<Definition of Table>

In the present teaching, a table is a data table constructed as a database. The data table includes a look up table, a reference table, and so forth.

<Other Definitions>

In the present teaching, an end portion of a member indicates a portion constituted by an end and its surroundings of the member.

In the present teaching, an expression "members A and B are lined up in an X direction" indicates the following state. When the members A and B are viewed in a direction orthogonal to the X direction, the members A and B are both provided on a linear line which is parallel to the X direction. In the present teaching, an expression "members A and B are provided side by side in an X direction when viewed in a Y direction" indicates the following state. When the members A and B are viewed in the Y direction, the members A and B are both provided on a linear line which is parallel to the X direction. In this regard, when the members A and B are viewed in a W direction which is different from the Y direction, the member A or B may not be provided on the linear line which is parallel to the X direction. The members A and B may be in contact with each other. The members A and B may not be in contact with each other. A member C may be provided between the members A and B.

In this specification, an expression "a member A is provided forward of a member B" indicates the following state. The member A is provided in front of a plane which passes the front-most end of the member B and is orthogonal to the front-rear direction. In this connection, the members A and B may or may not be lined up in the front-rear direction. This applies to the directions other than the front-rear direction. (That is to say, this applies to the directions other than "forward of", such as "rearward of", "leftward of", and "rightward of".)

In this specification, an expression "a member A is provided in front of a member B" indicates the following state. The members A and B are lined up in the front-rear direction and a part of the member A, the part facing the member B, is provided in front of the member B. According to this definition, when a part of the front surface of the member B, the part facing the member A, is the front-most end of the member B, the member A is provided forward of the member B. According to the definition, when a part of the front surface of the member B, the part facing the member A, is not the front-most end of the member B, the member A may or may not be provided forward of the member B. This applies to the directions other than the front-rear direction. (That is to say, this applies to the directions other than "in front of", such as "behind", "straight below", "to the left of", and "to the right of".) The front surface of the member B is a surface which is viewable when the member B is viewed from the front side. Depending on the shape of the member B, the front surface of the member B may be formed of plural surfaces, instead of a single continuous surface.

In this specification, an expression "a member A is provided in front of a member B when viewed in the left-right direction" indicates the following state. The members A and B are lined up in the front-rear direction when viewed in the left-right direction and a part of the member A, the part facing the member B, is provided in front of the member B when viewed in the left-right direction. According to this definition, the members A and B may not be lined up in the front-rear direction in three dimensions. This applies to the directions other than the front-rear direction. (That is to say, this applies to the directions other than "forward of", such as "rearward of", "leftward of", and "rightward of".)

In the present teaching, terms "including", "comprising", "having", and derivatives thereof are used to encompass not only listed items and equivalents thereof but also additional items. The terms "mounted", "connected", and "coupled" are used in broad sense. To be more specific, the terms encompass not only directly mounting, connection, and coupling but also indirect mounting, connection, and coupling. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs.

Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicate "may but not must". In this specification, an arrangement which is explained by using the term "may" exerts at least the above-described effects of the arrangement (1) above.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, the arrangements of the above-described different aspects may be variously combined.

Before an embodiment of the present teaching is detailed, it is informed that the present teaching is not limited to the configurations and layout of elements described below and/or shown in drawings. The present teaching may be implemented as another embodiment, or as an embodiment with various changes. Furthermore, the present teaching may be implemented by suitably combining below-described modifications.

Advantageous Effects

The present teaching makes it possible to easily acquire the angular speed of the leaning vehicle about the road surface perpendicular axis.

BRIEF DESCRIPTION OF THE DRAWINGS

FIG. 13A shows the relationship between steering angle in regular circular turning at a predetermined vehicle speed and angular speed about the road surface perpendicular axis.

FIG. 13B shows the relationship between steering angle in regular circular turning at predetermined vehicle speed and inclination angle in the left-right direction.

FIG. 15A shows a measurement result of a steering angle.

FIG. 15B shows a measurement result of vehicle speed.

FIG. 15C shows a measurement result and a calculation result of angular speed about a road surface perpendicular axis.

FIG. 15D shows a measurement result and a calculation result of inclination angle in the left-right direction.

FIG. 19A shows a modification of a table showing the relationship between steering angle, vehicle speed, and angular speed about a road surface perpendicular axis.

FIG. 19B is a modification of a table showing the relationship between steering angle, vehicle speed, and inclination angle in the left-right direction.

DETAILED DESCRIPTION

Description of Embodiments

Embodiment of Present Teaching

Figure 1:
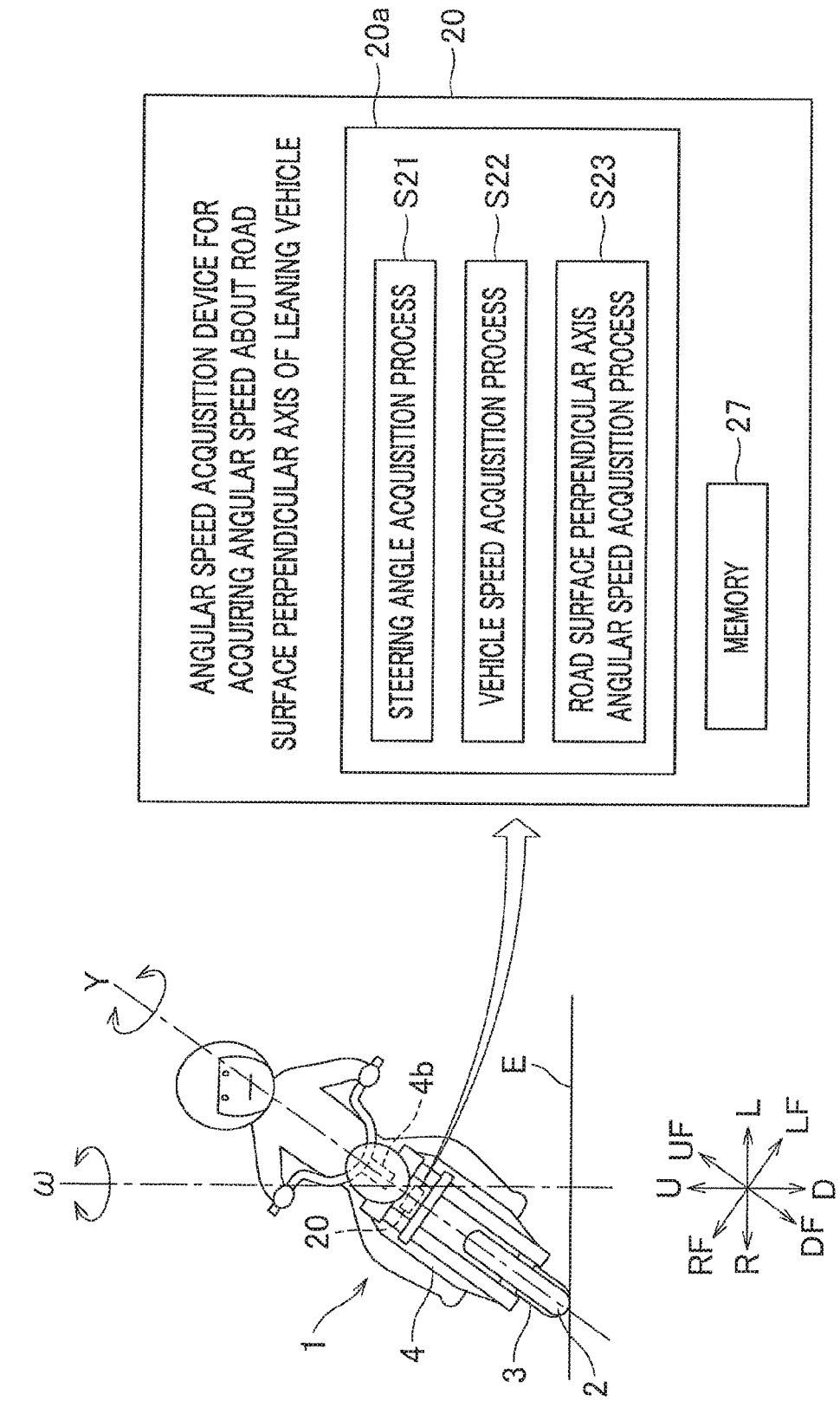
FIG. 1 is a schematic representation of the structure of a leaning vehicle of an embodiment of the present teaching, on which an angular speed acquisition device for acquiring angular speed about a road surface perpendicular axis of the leaning vehicle is mounted.

The following will describe an angular speed acquisition device for acquiring angular speed about a road surface perpendicular axis of a leaning vehicle of an embodiment of the present teaching, with reference to FIG. 1. In the following descriptions, a vehicle front-rear direction of the leaning vehicle 1 may be simply referred to as a front-rear direction. A vehicle left-right direction of the leaning vehicle 1 may be simply referred to as a left-right direction. Arrows F and B in FIG. 1 indicate forward and rearward in the vehicle front-rear direction of the leaning vehicle 1, respectively. Arrows L and R in FIG. 1 indicate leftward and rightward in the vehicle left-right direction of the leaning vehicle 1, respectively. Arrows U and D in FIG. 1 indicate upward and downward in the vehicle up-down direction of the leaning vehicle 1, respectively. The vehicle up-down direction of the leaning vehicle 1 is identical with a road surface perpendicular direction of the leaning vehicle 1. The road surface perpendicular direction is a direction perpendicular to a road surface E on which the leaning vehicle 1 runs. Arrows UF, DF, FF, BF, LF, and RF in FIG. 1 indicate upward, downward, forward, rearward, leftward, and rightward of the vehicle body frame 4, respectively. In this specification, an up-down direction (UFDF direction) of the vehicle body frame 4 is in parallel to the axial direction of the steering shaft 4b of the vehicle body frame 4. A left-right direction (LFRF direction) of the vehicle body frame 4 is orthogonal to a plane which passes the center in the width direction of the vehicle body frame 4. A front-rear direction (FFBF direction) of the vehicle body frame 4 is orthogonal to both the up-down direction (UFDF direction) of the vehicle body frame 4 and the left-right direction (LFRF direction) of the vehicle body frame 4.

As shown in FIG. 1, the vehicle body frame 4 of the motorcycle 1 is structured to lean rightward of the motorcycle 1 in the vehicle left-right direction when turning right and lean leftward of the motorcycle 1 in the vehicle left-right direction when turning left. When the vehicle body frame 4 leans, the vehicle left-right direction (LR direction) of the motorcycle 1 does not coincide with the left-right direction (LFRF direction) of the vehicle body frame 4 in front view. When the vehicle body frame 4 leans in the left-right direction, the up-down direction (UD direction) of the motorcycle 1 does not coincide with the up-down direction (UFDF direction) of the vehicle body frame 4 in front view. When viewed in the upward or downward direction, the vehicle front-rear direction (FB direction) of the motorcycle 1 coincides with the front-rear direction (FFBF direction) of the vehicle body frame 4. When a handle unit 5 is rotated, a plane, which passes the center in the width direction of a front wheel, leans relative to the vehicle front-rear direction (FB direction) of the motorcycle 1 and the front-rear direction (FFBF direction) of the vehicle body frame 4, when viewed in the upward or downward direction. FIG. 1 shows the leaning vehicle 1 which leans relative to the road surface E.

As shown in FIG. 1, an angular speed acquisition device 20 for acquiring angular speed about the road surface perpendicular axis of the leaning vehicle is mounted on the leaning vehicle 1. The leaning vehicle 1 includes the vehicle body frame 4, a front wheel unit 2, a rear wheel unit 3, and at least one steering shaft 4b. The vehicle body frame 4 leans rightward in the vehicle left-right direction when turning right and leans leftward in the vehicle left-right direction when turning left. The front wheel unit 2 and the rear wheel unit 3 are supported by the vehicle body frame 4. The front wheel unit 2 includes at least one front wheel. The rear wheel unit 3 includes at least one rear wheel. The rear wheel unit 3 is provided rearward of the front wheel unit 2 in the vehicle front-rear direction. The steering shaft 4b steers at least one of the front wheel unit 2 or the rear wheel unit 3. In the present embodiment, the steering shaft 4b steers the front wheel unit 2.

The angular speed acquisition device 20 for acquiring angular speed about the road surface perpendicular axis of the leaning vehicle is mounted on the leaning vehicle 1. The angular speed acquisition device 20 for acquiring angular speed about the road surface perpendicular axis of the leaning vehicle acquires the angular speed co about the road surface perpendicular axis (g axis in FIG. 12) of the leaning vehicle 1. The road surface perpendicular axis g is an axis in the direction orthogonal to the road surface E on which the leaning vehicle 1 runs. Y in FIG. 1 indicates angular speed about a fixed axis (Z axis in FIG. 12) of the vehicle body frame 4.

The angular speed acquisition device 20 for acquiring angular speed about the road surface perpendicular axis of the leaning vehicle includes a processor 20a and a memory 27. The memory 27 is a storage device configured to store sets of data. Examples of the memory 27 include a ROM (Read Only Memory) and a RAM (Random Access Memory). The RAM temporarily stores various types of data when the processor 20a executes a program. The ROM stores programs executed by the processor 20a. The processor 20a is configured to execute a series of below-described processes by reading a program stored in the memory 27.

When the processor 20a is a programmable processor, the processor 20a may be programmed to execute the series of processes below. The following will describe the series of processes executed by the processor 20a.

The memory 27 stores the relationship between steering angle, vehicle speed, and angular speed co about the road surface perpendicular axis in advance. The processor 20a acquires a steering angle signal (steering angle acquisition process S21). The steering angle signal relates to a steering angle of the leaning vehicle 1, which is a rotation angle about the rotational axis of the steering shaft 4b. The processor 20a acquires a vehicle speed signal (vehicle speed acquisition process S22). The vehicle speed signal relates to vehicle speed of the leaning vehicle 1. Based on the relationship between steering angle, vehicle speed, and angular speed ω about the road surface perpendicular axis stored in the memory 27, the processor 20a acquires the angular speed about the road surface perpendicular axis from the steering angle signal acquired in the steering angle acquisition process S21 and the vehicle speed signal acquired in the vehicle speed acquisition process S22 (road surface perpendicular axis angular speed acquisition process S23).

The angular speed acquisition device 20 for acquiring angular speed about the road surface perpendicular axis of the leaning vehicle of the embodiment of the present teaching has the following characteristics.

The angular speed acquisition device 20 for acquiring angular speed about the road surface perpendicular axis of the leaning vehicle includes the memory 27 and the processor 20a. The memory 27 stores the relationship between steering angle which is a rotation angle about the rotational axis of the steering shaft 4b, vehicle speed of the leaning vehicle, and angular speed ω about the road surface perpendicular axis in advance. The relationship between steering angle, vehicle speed, and angular speed about the road surface perpendicular axis may be stored as a voltage signal detected by a sensor or the like, or may be stored as a value. The processor 20a is configured or programmed to execute the steering angle acquisition process S21, the vehicle speed acquisition process S22, and the road surface perpendicular axis angular speed acquisition process S23. In the steering angle acquisition process S21, a signal related to a steering angle which is a rotation angle about the rotational axis of the steering shaft 4b is acquired as a steering angle signal. In the vehicle speed acquisition process S22, a signal related to vehicle speed of the leaning vehicle 1 is acquired as a vehicle speed signal. In the road surface perpendicular axis angular speed acquisition process S23, angular speed ω about the road surface perpendicular axis is acquired based on the relationship between steering angle, vehicle speed, and angular speed ω about the road surface perpendicular axis stored in the memory 27, the steering angle signal, and the vehicle speed signal. Because the memory 27 stores the relationship between steering angle, vehicle speed, and angular speed ω about the road surface perpendicular axis, the angular speed ω about the road surface perpendicular axis is acquired when the steering angle and the vehicle speed are determined. The processor 20a is able to easily acquire the steering angle signal and the vehicle speed signal. On this account, the angular speed acquisition device 20 for acquiring angular speed about the road surface perpendicular axis of the leaning vehicle is able to easily acquire the angular speed ω about the road surface perpendicular axis, based on the steering angle signal and the vehicle speed signal which can be easily acquired. The angular speed acquisition device 20 for acquiring angular speed about the road surface perpendicular axis of the leaning vehicle is therefore able to easily acquire the angular speed ω about the axis perpendicular to the road surface of the leaning vehicle 1.

Specific Example of Embodiment of Present Teaching

The following describes a specific example of the above-described embodiment of the present teaching. An explanation is given with the assumption that the leaning vehicle 1 of the embodiment of the present teaching is a motorcycle. It is noted that items identical with those in the embodiment of the present teaching having been described above are not explained again. The specific example of the embodiment of the present teaching basically encompasses the entirety of the above-described embodiment of the present teaching. Arrows F and B in each figure indicate forward and rearward in the vehicle front-rear direction, respectively, whereas arrows L and R indicate leftward and rightward in the vehicle left-right direction, respectively. Arrows U and D indicate upward and downward in the vehicle up-down direction, respectively. The vehicle up-down direction is perpendicular to the road surface E.

First Specific Example

Figure 2:
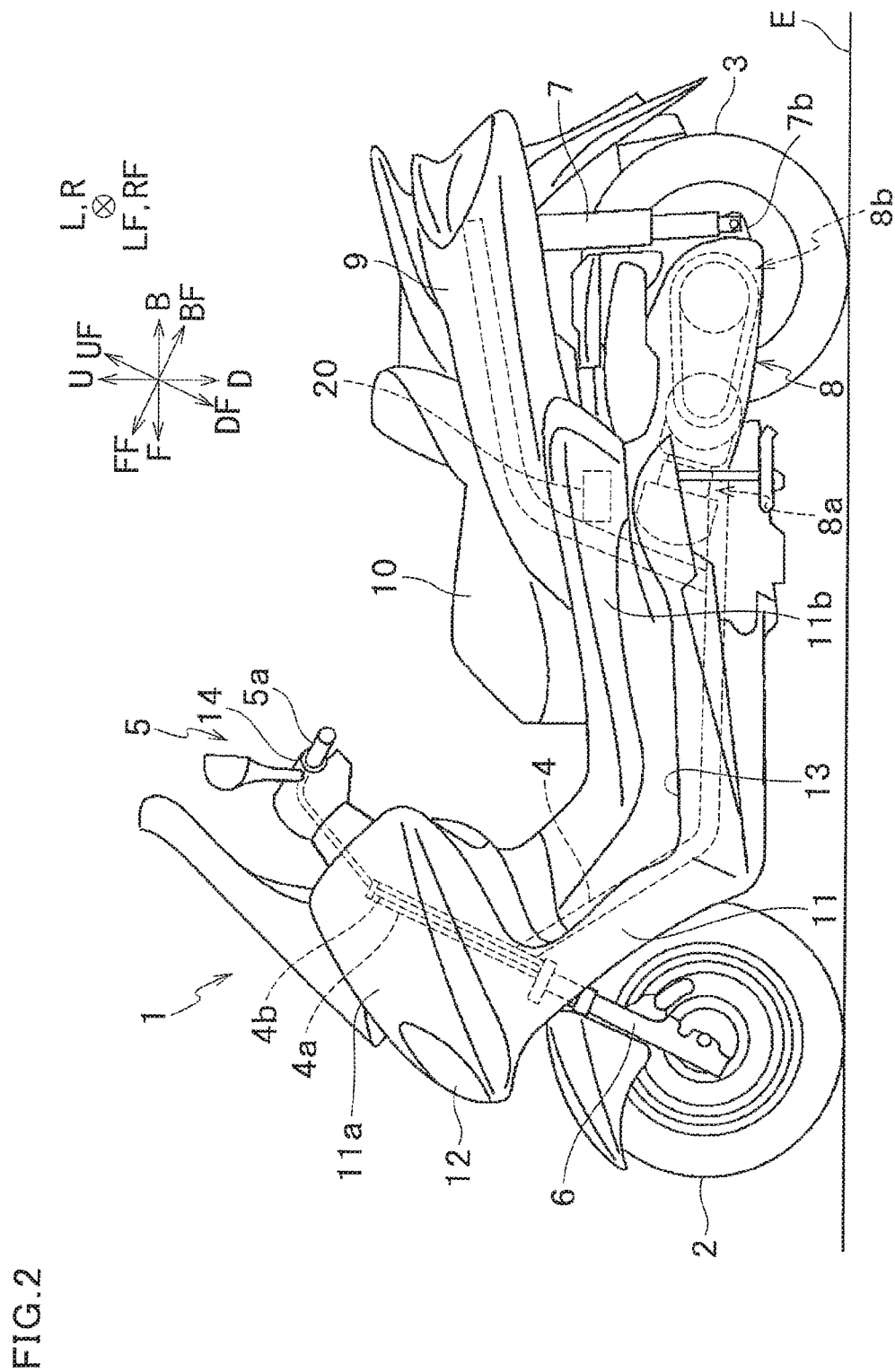
FIG. 2 is a left side view schematically showing a motorcycle on which the angular speed acquisition device for acquiring angular speed about the road surface perpendicular axis of the leaning vehicle of First Specific Example of the embodiment of the present teaching is mounted.
Figure 3:
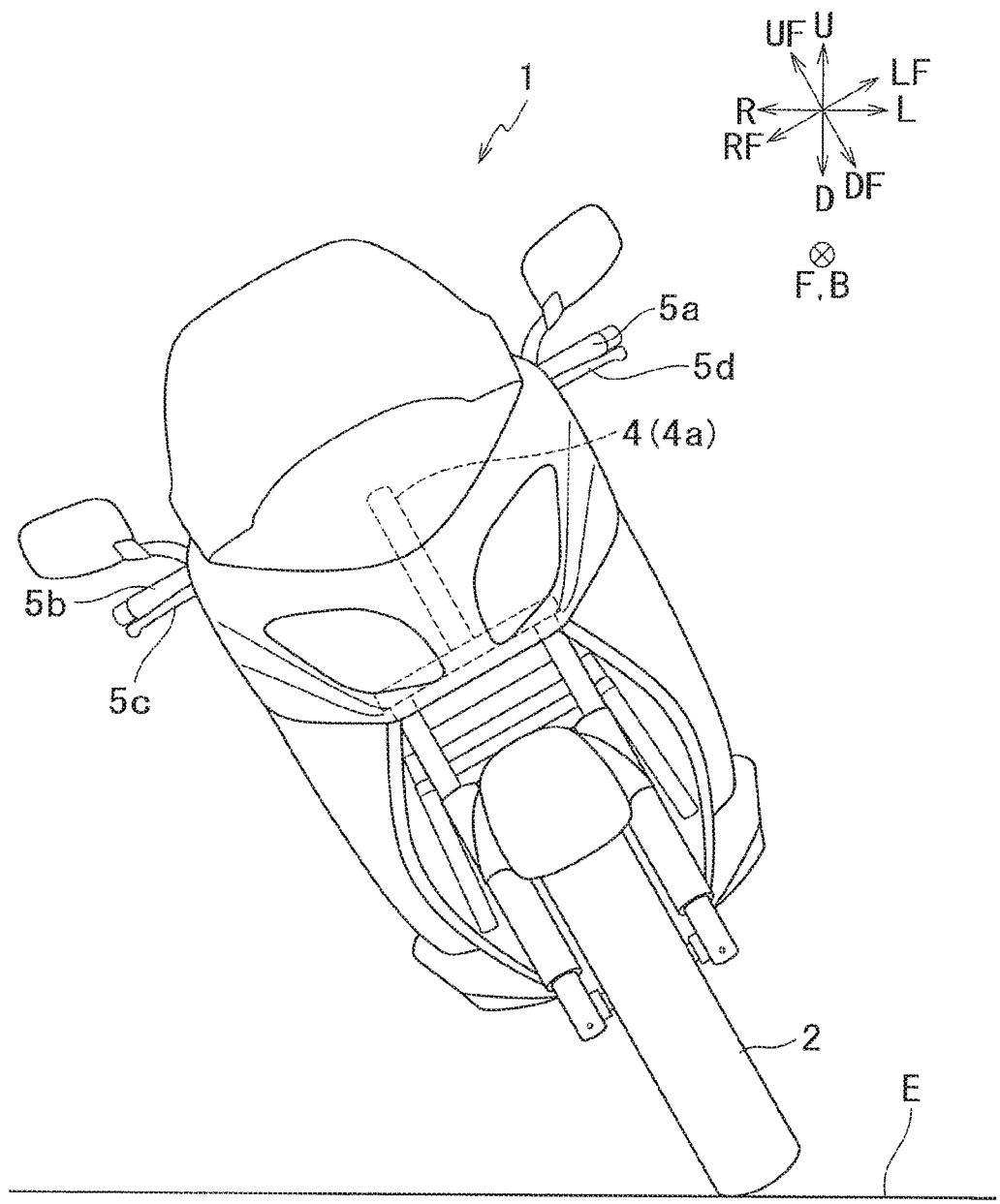
FIG. 3 is a front view showing a state in which a vehicle body frame of the motorcycle of FIG. 2 leans.

First Specific Example of the embodiment of the present teaching will be described with reference to FIG. 2 to FIG. 15. FIG. 2 shows the motorcycle 1 on the road surface E, which is provided so that the vehicle body frame 4 is in an upright state. FIG. 3 shows the motorcycle 1 on the road surface E, in which the vehicle body frame 4 leans. In both FIG. 2 and FIG. 3, the road surface E is a horizontal plane. While in the figures the road surface E is regarded as a plane for simplicity, the road surface E may not be a plane. Furthermore, while in the figures the road surface E is regarded to be horizontal for simplicity, the road surface E may not be horizontal.

<Overall Structure of Motorcycle 1>

As shown in FIG. 2, the motorcycle 1 includes the front wheel unit 2, the rear wheel unit 3, and the vehicle body frame 4. A head pipe 4a is provided at a front portion of the vehicle body frame 4. A steering shaft 4b is rotatably inserted into the head pipe 4a. An upper end portion of the steering shaft 4b is connected to a handle unit 5. The handle unit 5 is supported by the head pipe 4a to be rotatable about the steering shaft 4b. As a driver holding a left grip 5a and a right grip 5b which will be described later steers the handle unit 5 by moving the left grip 5a and the right grip 5b in the front-rear direction, the steering shaft 4b is rotated.

Upper end portions of paired left and right front forks 6 are fixed to a lower end portion of the steering shaft 4b. A lower end portion of each front fork 6 supports the front wheel unit 2. The front wheel unit 2 is composed of one front wheel. The front wheel includes a tire and a wheel. When the steering shaft 4b rotates, the front forks 6 rotate about the steering shaft 4b. When the front forks 6 rotate, the front wheel unit 2 rotates in the vehicle left-right direction about the grounding point where the front wheel unit 2 is in contact with the road surface E. In other words, the steering shaft 4b steers the front wheel unit 2. As the handle unit 5 is steered, the front wheel unit 2 is steered through the steering shaft 4b. The fixed axis (Z axis shown in FIG. 12) of the vehicle body frame 4 is an axis of the vehicle body frame 4 extending along the vehicle up-down direction when the motorcycle 1 is in the upright state. The fixed axis of the vehicle body frame 4 is an axis fixed to the vehicle body frame 4. When the motorcycle 1 is in the upright state, the fixed axis of the vehicle body frame 4 passes a predetermined part of the vehicle body frame such as the center of gravity of the motorcycle 1, and is parallel to the vehicle up-down direction. When the motorcycle 1 leans in the vehicle left-right direction, the fixed axis of the vehicle body frame 4 leans in the vehicle left-right direction relative to the road surface perpendicular direction. To put it differently, the fixed axis of the vehicle body frame 4 is not parallel to the vehicle up-down direction when the motorcycle 1 is in a lean state. Each front fork 6 includes a front suspension (not illustrated) which is configured to absorb shock in the up-down direction.

A front brake 2a (see FIG. 5) is provided at the front wheel unit 2. The front brake 2a is a so-called disc brake. The front brake 2a may not be a disc brake. The brake converts kinetic energy to energy of another form (e.g., thermal energy) or to kinetic energy of a different type. The front brake 2a may be a drum brake. The front brake 2a may be a hydraulic brake, a mechanical brake, or an electric brake.

The vehicle body frame 4 supports a fuel tank 9 and a seat 10. The engine unit 8 is provided below the upper end of the seat 10. The vehicle body frame 4 supports the engine unit 8 in a swingable manner. The engine unit 8 may be a 4-stroke engine or a 2-stroke engine. A rear end portion of the engine unit 8 supports the rear wheel unit 3. The rear wheel unit 3 is composed of one rear wheel. The engine unit 8 is connected to one end portion of the rear suspension 7 at a boss portion 7b. The rear suspension 7 is configured to absorb shock in the up-down direction. The other end portion of the rear suspension 7 is attached to the vehicle body frame 4.

A rear brake 3a (see FIG. 5) is provided at the rear wheel unit 3. The rear brake 3a is a so-called disc brake. The rear brake 3a may not be a disc brake. The rear brake 3a may be a drum brake. The rear brake 3a may be a hydraulic brake, a mechanical brake, or an electric brake.

The engine unit 8 includes an engine main body 8a and a transmission 8b. Driving force output from the engine main body 8a is transmitted to the rear wheel unit 3 via the transmission 8b. The vehicle body frame 4 supports a battery (not illustrated). The battery supplies electric power to electronic devices such as a controller 50 and sensors which will be described later.

Figure 5:
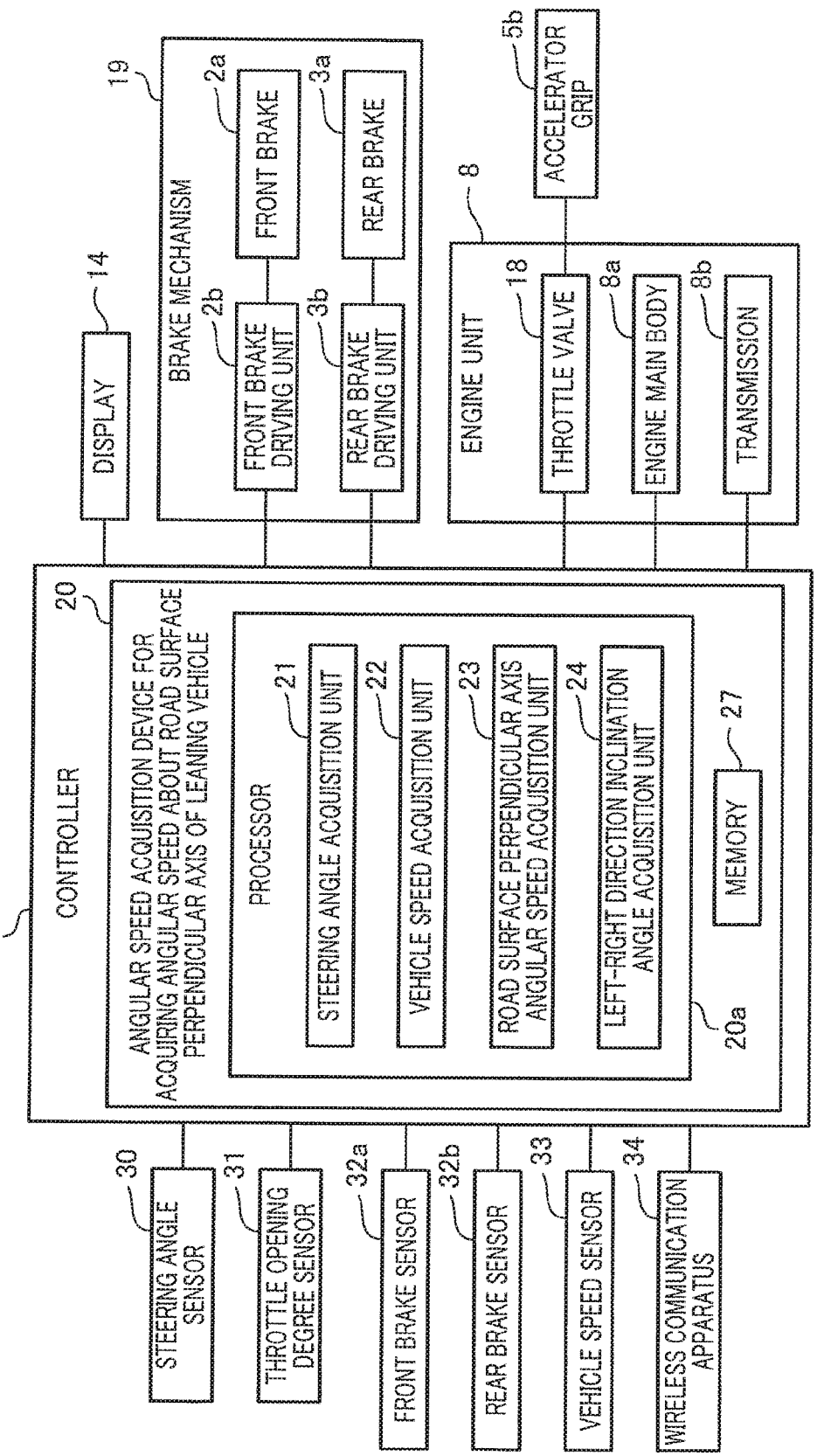
FIG. 5 is a control block diagram of the motorcycle of FIG. 2.

As shown in FIG. 5, in one embodiment, the motorcycle 1 includes a wireless communication apparatus 34. The wireless communication apparatus 34 is configured to be able to receive a GNSS (Global Navigation Satellite System) signal. The GNSS signal includes information of a current location such as longitude and latitude, for example. The wireless communication apparatus 34 is configured to be able to perform vehicle-to-vehicle communication and road-to-vehicle communication. The vehicle-to-vehicle communication is communication which is performed between on-board communication apparatuses. The road-to-vehicle communication is communication performed between a road-side communication apparatus mounted on a road and an on-board communication apparatus. The on-board communication apparatus transmits information such as speed of the vehicle on which the on-board communication apparatus is mounted to a road-side communication apparatus or an on-board communication apparatus of another vehicle. The road-side communication apparatus is configured to transmit information regarding road (e.g., signal information and regulation information) to an on-board communication apparatus. The road-side communication apparatus transmits information received from an on-board communication apparatus to another on-board communication apparatus. The information transmitted by the road-side communication apparatus may include the existence of a vehicle and the speed of a vehicle. The wireless communication apparatus 34 may be configured to be able to receive a signal transmitted from a communication center remote from the road. Data received by the wireless communication apparatus 34 may include map data.

The seat 10 is supported at an upper part of the vehicle body frame 4. The vehicle body frame 4 is at least partially covered with a vehicle body cover 11. The vehicle body cover 11 includes a front cover 11a and side covers 11b. The front cover 11a is provided at a front portion of the motorcycle 1. The side covers 11b are provided below the seat 10 to be on the left and right sides, respectively. A headlight 12 is provided in the front cover 11a. An upper portion of each front fork 6 is covered with the front cover 11a. A step board 13 is provided directly below each side cover 11b. The step boards 13 are provided on the left and right sides of the motorcycle 1, respectively. Each step board 13 is a foot rest for the driver. A fuel tank 9 is provided below the seat 10.

The handle unit 5 includes a left grip 5a and a right grip 5b (see FIG. 3). The right grip 5b is an accelerator grip. The accelerator grip 5b is operated to adjust output of the engine main body 8a. To be more specific, the accelerator grip 5b is operated to adjust the opening degree of a throttle valve 18 of the engine unit 8. A brake lever 5c (see FIG. 3) is provided in front of the right grip 5b. A brake lever 5c provided in front of the right grip 5b is referred to as a right brake lever 5c. As the driver operates the right brake lever 5c, the front brake 2a is activated and the rotation of the front wheel unit 2 is braked. The front brake 2a is activated not only by an operation of the right brake lever 5c but also by a front brake driving unit 2b (see FIG. 5). The front brake driving unit 2b is controlled by a controller 50. The front brake 2a and the front brake driving unit 2b are included in a brake mechanism 19. A brake lever 5d (see FIG. 3) is provided in front of the left grip 5a. The brake lever 5d provided in front of the left grip 5a is referred to as a left brake lever 5d. As the driver operates the left brake lever 5d, the rear brake 3a is activated and the rotation of the rear wheel unit 3 is braked. The rear brake 3a is activated not only by an operation of the left brake lever 5d but also by a rear brake driving unit 3b (see FIG. 5). The rear brake driving unit 3b is controlled by the controller 50. The rear brake 3a and the rear brake driving unit 3b are included in the brake mechanism 19.

The opening degree of the throttle valve 18 is changed as the driver rotationally operates the accelerator grip 5b. The throttle valve 18 may be connected to the accelerator grip 5b by an unillustrated throttle wire. The throttle valve 18 may be an electronic throttle valve which is arranged such that the opening degree is controlled by the controller 50 in accordance with an operation of the accelerator grip 5b.

As shown in FIG. 2, a display device 14 is provided on the handle unit 5. The display 14 is configured to display, for example, vehicle speed, engine rotation speed, warnings, and the like. Furthermore, the handle unit 5 is provided with switches. Power supply from the battery to electric device can be started or stopped by a switch operation. Furthermore, the engine unit 8 can be activated or stopped by a switch operation. Furthermore, a screen on the display 14 is switchable by a switch operation.

Arrows UF, DF, FF, BF, LF, and RF in FIG. 2 and FIG. 3 indicate upward, downward, forward, rearward, leftward, and rightward of the vehicle body frame 4, respectively. In this specification, an up-down direction (UFDF direction) of the vehicle body frame 4 is in parallel to the axial direction of the head pipe 4a and the steering shaft 4b of the vehicle body frame 4. A left-right direction (LFRF direction) of the vehicle body frame 4 is orthogonal to a plane which passes the center in the width direction of the vehicle body frame 4. A front-rear direction (FFBF direction) of the vehicle body frame 4 is orthogonal to both the up-down direction (UFDF direction) of the vehicle body frame 4 and the left-right direction (LFRF direction) of the vehicle body frame 4.

As shown in FIG. 3, the vehicle body frame 4 of the motorcycle 1 is structured to lean rightward of the motorcycle 1 in the vehicle left-right direction when turning right and lean leftward of the motorcycle 1 in the vehicle left-right direction when turning left. When the vehicle body frame 4 leans, the vehicle left-right direction (LR direction) of the motorcycle 1 does not coincide with the left-right direction (LFRF direction) of the vehicle body frame 4 in front view. When the vehicle body frame 4 leans in the left-right direction, the up-down direction (UD direction) of the motorcycle 1 does not coincide with the up-down direction (UFDF direction) of the vehicle body frame 4 in front view. When viewed in the upward or downward direction, the vehicle front-rear direction (FB direction) of the motorcycle 1 coincides with the front-rear direction (FFBF direction) of the vehicle body frame 4. When a handle unit 5 is rotated, a plane, which passes the center in the width direction of a front wheel, leans relative to the vehicle front-rear direction (FB direction) of the motorcycle 1 and the front-rear direction (FFBF direction) of the vehicle body frame 4, when viewed in the upward or downward direction.

Figure 4:
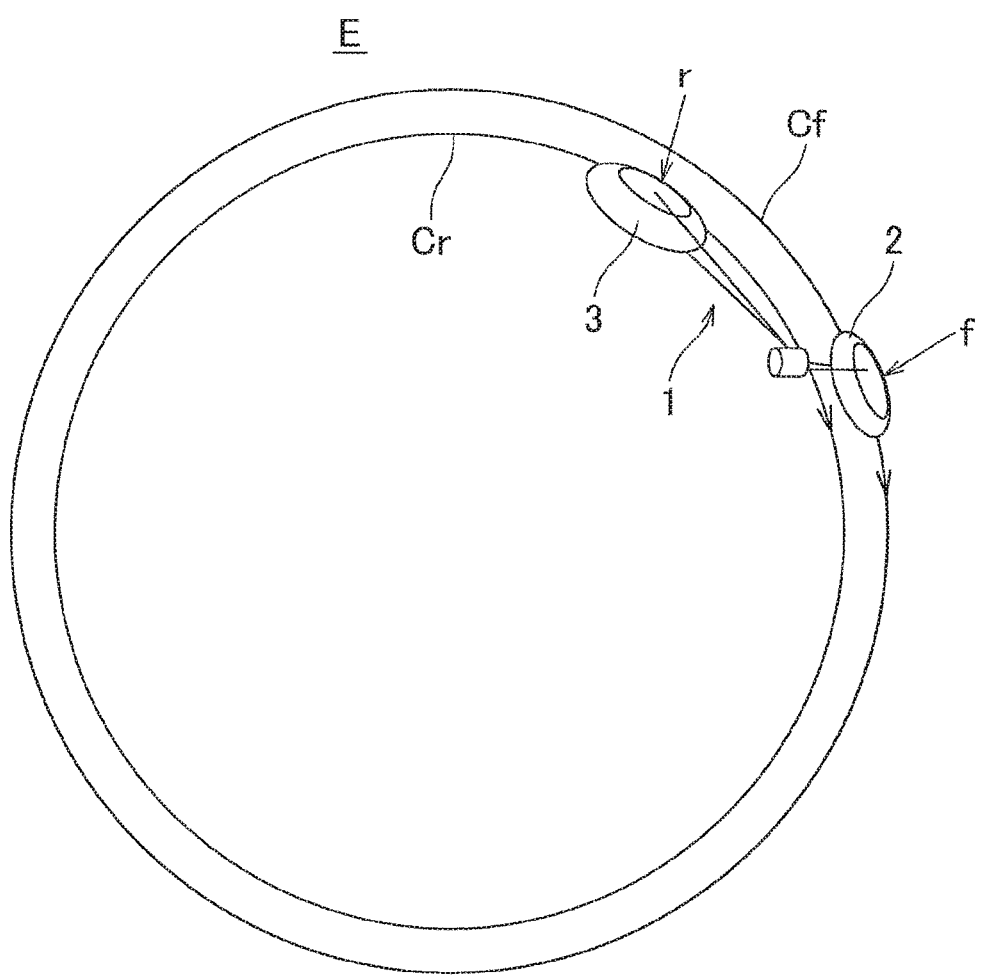
FIG. 4 is a top view schematically showing a running locus when the motorcycle shown in FIG. 2 runs on a circle on the road surface with a constant steering angle.

FIG. 4 schematically shows the front wheel unit 2, the rear wheel unit 3, and the vehicle body frame 4 of the motorcycle 1 running while leaning relative to the road surface E, together with examples of two running loci F and R. Furthermore, FIG. 4 schematically shows two running loci Cf and Cr. The running locus Cf is a locus of a grounding point f of the front wheel unit 2 to the road surface E. The running locus Cr is a locus of a grounding point f of the rear wheel unit 3 to the road surface E. FIG. 4 schematically shows the motorcycle 1 which is running while leaning its vehicle body frame 4.

When the motorcycle 1 runs on a linear line on the road surface E in the upright state, the front wheel grounding point f and the rear wheel grounding point r move on the same linear line. The running locus Cf of the front wheel unit 2 coincides with the running locus Cr of the rear wheel unit 3. As a result, the vehicle speed V(f) of the front wheel unit 2 at the grounding point f is identical with the vehicle speed V(r) of the rear wheel unit 3 at the grounding point r. In FIG. 4, however, the motorcycle 1 runs on a circle on the road surface E, with a constant steering angle. In FIG. 4, the running locus Cf of the front wheel unit 2 and the running locus Cr of the rear wheel unit 3 are on different circles. When there is a difference between the running locus Cf of the front wheel unit 2 and the running locus Cr of the rear wheel unit 3, there may be a difference between the moving speed at the grounding point f of the front wheel unit 2 and the moving speed at the grounding point r of the rear wheel unit 3, which move on the running loci Cf and Cr. This is because the moving distance of the grounding point f of the front wheel unit 2 may be different from the moving distance of the grounding point r of the rear wheel unit 3 in unit time. In other words, strictly speaking, the vehicle speed of the motorcycle 1 running on a circle on the road surface E with a constant steering angle may be different between parts of the vehicle. The vehicle speed in the present teaching may be vehicle speed V(f) at the grounding point f of the front wheel unit 2. The vehicle speed in the present teaching may be vehicle speed V(r) at the grounding point r of the rear wheel unit 3. The vehicle speed in the present teaching may be an average value of the vehicle speed V(f) at the grounding point f of the front wheel unit 2 and the vehicle speed V(r) at the grounding point r of the rear wheel unit 3.

As shown in FIG. 5, the motorcycle 1 includes a steering angle sensor 30. The steering angle sensor 30 is configured to detect the rotation angle of the steering shaft 4b about the rotational axis. A rotation angle of the steering shaft 4b about the rotational axis is identical with a steering angle.

As shown in FIG. 5, the motorcycle 1 includes a throttle opening degree sensor 31. The throttle opening degree sensor 31 is configured to detect the opening degree of the throttle valve 18. The throttle opening degree sensor 31 may detect the opening degree of the accelerator grip 5b. The motorcycle 1 includes a front brake sensor 32a and a rear brake sensor 32b. The front brake sensor 32a is configured to detect the braking force of braking the front wheel unit 2 by the front brake 2a. When the front brake 2a is a hydraulic brake, the braking force of braking the front wheel unit 2 by the front brake 2a is acquired by pressure of the front brake 2a. The rear brake sensor 32b is configured to detect the braking force of braking the rear wheel unit 3 by the rear brake 3a. When the rear brake 3a is a hydraulic brake, the braking force of braking the rear wheel unit 3 by the rear brake 3a is acquired by pressure of the rear brake 3a. The motorcycle 1 includes a vehicle speed sensor 33. The vehicle speed sensor 33 is configured to detect vehicle speed which is speed of the motorcycle 1 in the vehicle front-rear direction (FB direction). The vehicle speed sensor 33 may detect speed in the traveling direction as vehicle speed.

<Structure of Angular Speed Acquisition Device 20 for Acquiring Angular Speed About Road Surface Perpendicular Axis of Leaning Vehicle>

As shown in FIG. 5, the motorcycle 1 includes the controller 50 which is configured to control operations of parts of the motorcycle 1. The controller 50 may be included in an ECU (Electronic Control Unit) and constitute a single apparatus, or may be an apparatus provided at a location different from the ECU. The controller 50 may be a single device provided at a single position or may be formed of a plurality of devices which are positionally separated from one another. The controller 50 is mounted on the motorcycle 1. The controller 50 is connected to the above-described sensors 30 to 33 and the wireless communication apparatus 34. The controller 50 includes and is integrated with the angular speed acquisition device 20 for acquiring angular speed about the road surface perpendicular axis of the leaning vehicle. The angular speed acquisition device 20 for acquiring angular speed about the road surface perpendicular axis of the leaning vehicle is connected to the above-described sensors 30 to 33 and the wireless communication apparatus 34 via the controller 50. The angular speed acquisition device 20 for acquiring angular speed about the road surface perpendicular axis of the leaning vehicle includes the processor 20a and the memory 27. The processor 20a and the memory 27 of the angular speed acquisition device 20 for acquiring angular speed about the road surface perpendicular axis of the leaning vehicle may or may not be used as a processor and a memory of the controller 50. The processor 20a executes various types of information processing based on a program and sets of data stored in the memory 27. The angular speed acquisition device 20 for acquiring angular speed about the road surface perpendicular axis of the leaning vehicle may be independent from the controller 50. Also in this case, the angular speed acquisition device 20 for acquiring angular speed about the road surface perpendicular axis of the leaning vehicle is mounted on the motorcycle 1.

The memory 27 shown in FIG. 5 stores the relationship between steering angle, vehicle speed, and angular speed about the road surface perpendicular axis in advance. Furthermore, the memory 27 stores the relationship between steering angle, vehicle speed, and inclination angle in the left-right direction in advance. The inclination angle in the left-right direction is an angle (A in FIG. 12) of inclination of the fixed axis when the fixed axis (Z axis in FIG. 12) of the vehicle body frame 4 which is along the vehicle up-down direction when the motorcycle 1 is in the upright state leans in the vehicle left-right direction relative to the road surface perpendicular direction (g in FIG. 12). The fixed axis of the vehicle body frame 4 is an axis along the vehicle up-down direction when the motorcycle 1 is in the upright state. The fixed axis of the vehicle body frame 4 is an axis fixed to the vehicle body frame 4 of the motorcycle 1. The relationship between steering angle, vehicle speed, and angular speed about the road surface perpendicular axis is determined by a constant steering angle and angular speed about the road surface perpendicular axis, which are measured when the motorcycle 1 runs on a circle at a constant vehicle speed. The relationship between steering angle, vehicle speed, and inclination angle in the left-right direction is determined by a constant steering angle and inclination angle in the left-right direction, which are measured when the motorcycle 1 runs on a circle at a constant vehicle speed. In other words, as described above, the relationship between steering angle, vehicle speed, and angular speed about the road surface perpendicular axis and the relationship between steering angle, vehicle speed, and inclination angle in the left-right direction are determined by using a steering compatible vehicle model which is based on the assumption that the driver steers the handle in the same direction as the traveling direction desired by the driver. In this specific example, as tables, the memory 27 stores the relationship between steering angle, vehicle speed, and angular speed about the road surface perpendicular axis and the relationship between steering angle, vehicle speed, and inclination angle in the left-right direction in advance.

Figure 7A:
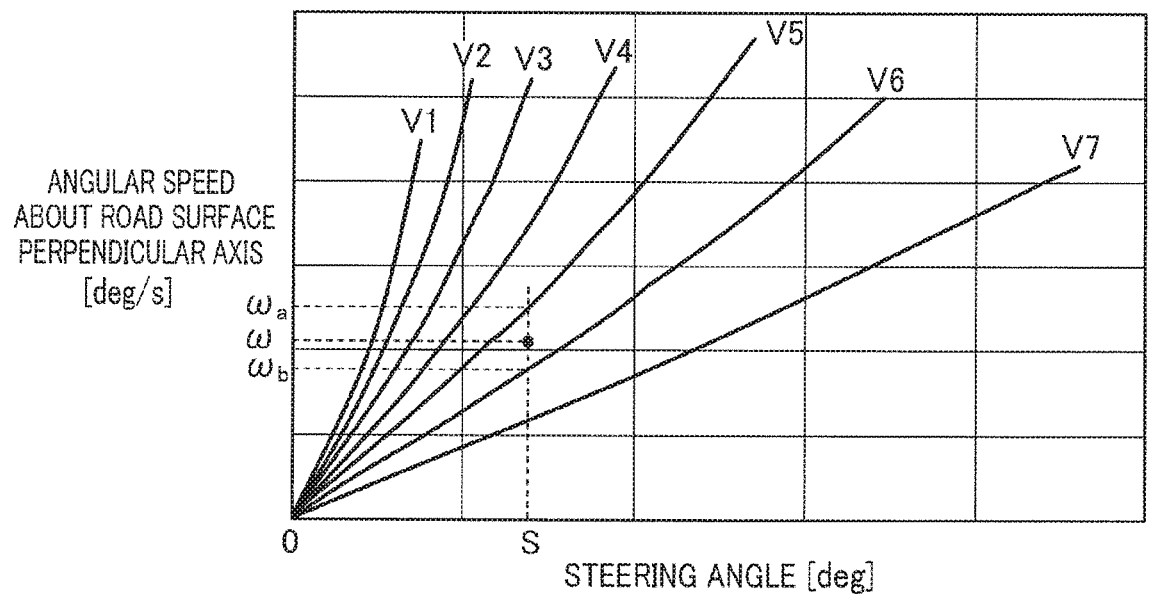
FIG. 7A is a table showing the relationship between steering angle, vehicle speed, and angular speed about a road surface perpendicular axis.

The table shown in FIG. 7A is an example of a table showing the relationship between steering angle, vehicle speed, and angular speed about the road surface perpendicular axis. The table shown in FIG. 7A will be referred to as a table of the angular speed about the road surface perpendicular axis. The table of the angular speed about the road surface perpendicular axis shown in FIG. 7A is determined based on steering angles, vehicle speeds, and angular speeds about the road surface perpendicular axis, which are measured when the motorcycle 1 performs regular circular turning at different vehicle speeds and on differently-sized circles in advance. The regular circular turning indicates that the motorcycle 1 runs on a circle at a constant vehicle speed. The table of the angular speed about the road surface perpendicular axis shown in FIG. 7A indicates, by a line, the relationship between angular speed about the road surface perpendicular axis and steering angle at each of vehicle speeds V1 to V7. To be more specific, the table of the angular speed about the road surface perpendicular axis shown in FIG. 7A indicates the relationship between angular speed about the road surface perpendicular axis and steering angle at each of vehicle speeds V1 to V7, by a substantial linear line (hereinafter, linear line) which passes the origin and has inclination. The vehicle speeds V1 to V7 are in an ascending order. The inclinations of the linear lines corresponding to the respective vehicle speeds V1 to V7 are in a descending order. The angular speed about the road surface perpendicular axis of the motorcycle 1 is measured in advance by using later-described simulation software or a sensor such as a later-described IMU (Inertial Measurement Unit).

Figure 7B:
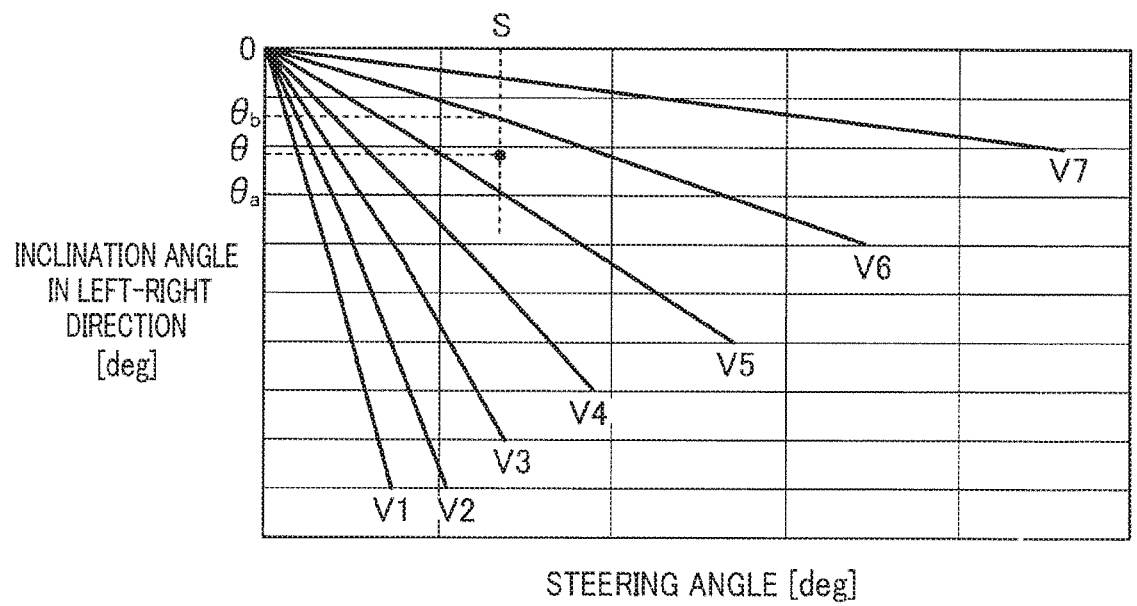
FIG. 7B is a table showing the relationship between steering angle, vehicle speed, and inclination angle in the left-right direction.

A table shown in FIG. 7B is an example of a table showing the relationship between steering angle, vehicle speed, and inclination angle in the left-right direction. The table shown in FIG. 7B will be referred to as a left-right direction inclination angle table. The left-right direction inclination angle table shown in FIG. 7B is determined based on steering angles, vehicle speeds, and inclination angles in the left-right direction, which are measured when the motorcycle 1 performs regular circular turning at different vehicle speeds and on differently-sized circles in advance. The left-right direction inclination angle table shown in FIG. 7B indicates, by a line, the relationship between inclination angle in the left-right direction and steering angle at each of vehicle speeds V1 to V7. To be more specific, the left-right direction inclination angle table shown in FIG. 7B indicates the relationship between inclination angle in the left-right direction and steering angle at each of vehicle speeds V1 to V7, by a substantial linear line (hereinafter, linear line) which passes the origin and has inclination. The vehicle speeds V1 to V7 are in an ascending order as described above. The inclinations of the linear lines corresponding to the respective vehicle speeds V1 to V7 are in a descending order. The inclination angle in the left-right direction of the motorcycle 1 is measured in advance by using simulation software or a sensor such as an IMU.

As shown in FIG. 5, as function processors, the processor 20a of the angular speed acquisition device 20 for acquiring angular speed about the road surface perpendicular axis of the leaning vehicle includes a steering angle acquisition unit 21, a vehicle speed acquisition unit 22, a road surface perpendicular axis angular speed acquisition unit 23, and a left-right direction inclination angle acquisition unit 24. The steering angle acquisition unit 21 is a function processor executing a later-described steering angle acquisition process. The vehicle speed acquisition unit 22 is a function processor executing a later-described vehicle speed acquisition process. The road surface perpendicular axis angular speed acquisition unit 23 is a function processor executing a later-described road surface perpendicular axis angular speed detection process. The left-right direction inclination angle acquisition unit 24 is a function processor executing a later-described left-right direction inclination angle acquisition process.

The steering angle acquisition unit 21 is configured to acquire a steering angle signal. The steering angle signal relates to a steering angle which is a rotation angle about the rotational axis of the steering shaft 4b. As described above, the steering angle sensor 30 is configured to detect the rotation angle of the steering shaft about the rotational axis. The steering angle acquisition unit 21 acquires a steering angle signal detected by the steering angle sensor 30.

The vehicle speed acquisition unit 22 is configured to acquire a vehicle speed signal. The vehicle speed signal is a signal related to vehicle speed of the motorcycle 1. As described above, the vehicle speed sensor 33 is configured to detect the speed of the motorcycle 1 in the vehicle front-rear direction. The vehicle speed acquisition unit 22 acquires a vehicle speed signal detected by the vehicle speed sensor 33. The vehicle speed acquisition unit 22 may acquire a vehicle speed signal based on the speed of the vehicle received by the wireless communication apparatus 34.

The road surface perpendicular axis angular speed acquisition unit 23 is configured to acquire angular speed about the road surface perpendicular axis based on the relationship between steering angle, vehicle speed, and angular speed about the road surface perpendicular axis, a steering angle signal, and a vehicle speed signal. The relationship between steering angle, vehicle speed, and angular speed about the road surface perpendicular axis is shown in a table of the angular speed about the road surface perpendicular axis in FIG. 7A. To put it differently, with reference to the table of the angular speed about the road surface perpendicular axis shown in FIG. 7A, the road surface perpendicular axis angular speed acquisition unit 23 acquires angular speed about the road surface perpendicular axis, which corresponds to a steering angle signal acquired by the steering angle acquisition unit 21 and a vehicle speed signal acquired by the vehicle speed acquisition unit 22. In this connection, the table of the angular speed about the road surface perpendicular axis shown in FIG. 7A indicates the relationship only between steering angle, angular speed about the road surface perpendicular axis, and vehicle speeds V1 to V7. When the vehicle speed acquired from the vehicle speed signal acquired by vehicle speed acquisition unit 22 is none of the vehicle speeds V1 to V7, the angular speed about the road surface perpendicular axis is calculated as follows, for example. Vehicle speed acquired from a vehicle speed signal acquired by the vehicle speed acquisition unit 22 is referred to as vehicle speed V. A steering angle acquired from a steering angle signal acquired by the steering angle acquisition unit 21 is referred to as a steering angle S. An angular speed about the road surface perpendicular axis to be calculated is referred to as angular speed $\omega$ about the road surface perpendicular axis. To begin with, one of the vehicle speeds V1 to V7, which is lower than the vehicle speed V and is closest to the vehicle speed V is referred to as vehicle speed Va. In the example shown in FIG. 7A, the vehicle speed Va is the vehicle speed V5. Meanwhile, one of the vehicle speeds V1 to V7, which is higher than the vehicle speed V and is closest to the vehicle speed V is referred to as vehicle speed Vb. In the example shown in FIG. 7A, the vehicle speed Vb is the vehicle speed V6. The ratio of the difference between the vehicle speed Va and the vehicle speed V to the difference between the vehicle speed Vb and the vehicle speed V is referred to as Ra. The angular speed about the road surface perpendicular axis on a linear line at the vehicle speed Va, which corresponds to the steering angle S, is referred to as angular speed $\omega a$ about the road surface perpendicular axis. The angular speed about the road surface perpendicular axis on a linear line at the vehicle speed Vb, which corresponds to the steering angle S, is referred to as angular speed $\omega b$ about the road surface perpendicular axis. The angular speed $\omega$ about the road surface perpendicular axis is a value with which the ratio of the difference between the angular speed $\omega a$ about the road surface perpendicular axis and the angular speed $\omega$ about the road surface perpendicular axis to the difference between the angular speed $\omega b$ about the road surface perpendicular axis and the angular speed $\omega$ about the road surface perpendicular axis is Ra.

The left-right direction inclination angle acquisition unit 24 is configured to acquire an inclination angle in the left-right direction based on the relationship between steering angle, vehicle speed, and inclination angle in the left-right direction, a steering angle signal, and a vehicle speed signal. The relationship between steering angle, vehicle speed, and inclination angle in the left-right direction is indicated by a left-right direction inclination angle table shown in FIG. 7B. To put it differently, with reference to the left-right direction inclination angle table shown in FIG. 7B, the left-right direction inclination angle acquisition unit 24 acquires an inclination angle in the left-right direction from a steering angle signal acquired by the steering angle acquisition unit 21 and a vehicle speed signal acquired by the vehicle speed acquisition unit 22. In this connection, the left-right direction inclination angle table shown in FIG. 7B indicates the relationship only between steering angle, inclination angle in the left-right direction, and vehicle speeds V1 to V7. When the vehicle speed acquired from the vehicle speed signal acquired by the vehicle speed acquisition unit 22 is none of the vehicle speeds V1 to V7, the inclination angle in the left-right direction is calculated as follows, for example. Vehicle speed acquired from a vehicle speed signal acquired by the vehicle speed acquisition unit 22 is referred to as vehicle speed V. A steering angle acquired from a steering angle signal acquired by the steering angle acquisition unit 21 is referred to as a steering angle S. An inclination angle in the left-right direction to be calculated is referred to as an inclination angle $\theta$ in the left-right direction. To begin with, one of the vehicle speeds V1 to V7, which is lower than the vehicle speed V and is closest to the vehicle speed V is referred to as vehicle speed Va. In the example shown in FIG. 7B, the vehicle speed Va is the vehicle speed V5. Meanwhile, one of the vehicle speeds V1 to V7, which is higher than the vehicle speed V and is closest to the vehicle speed V is referred to as vehicle speed Vb. In the example shown in FIG. 7B, the vehicle speed Vb is the vehicle speed V6. The ratio of the difference between the vehicle speed Va and the vehicle speed V to the difference between the vehicle speed Vb and the vehicle speed V is referred to as Ra. An inclination angle in the left-right direction on a linear line at the vehicle speed Va, which corresponds to the steering angle S, is referred to as an inclination angle $\theta a$ in the left-right direction. An inclination angle in the left-right direction on a linear line at the vehicle speed Vb, which corresponds to the steering angle S, is referred to as an inclination angle $\theta b$ in the left-right direction. An inclination angle $\theta$ in the left-right direction is a value at which the ratio of the difference between the inclination angle $\theta a$ in the left-right direction and the inclination angle $\theta$ in the left-right direction to the difference between the inclination angle $\theta b$ in the left-right direction and the inclination angle $\theta$ in the left-right direction is Ra.

<Process of Angular Speed Acquisition Device 20 for Acquiring Angular Speed about Road Surface Perpendicular Axis of Leaning Vehicle>

Figure 20:
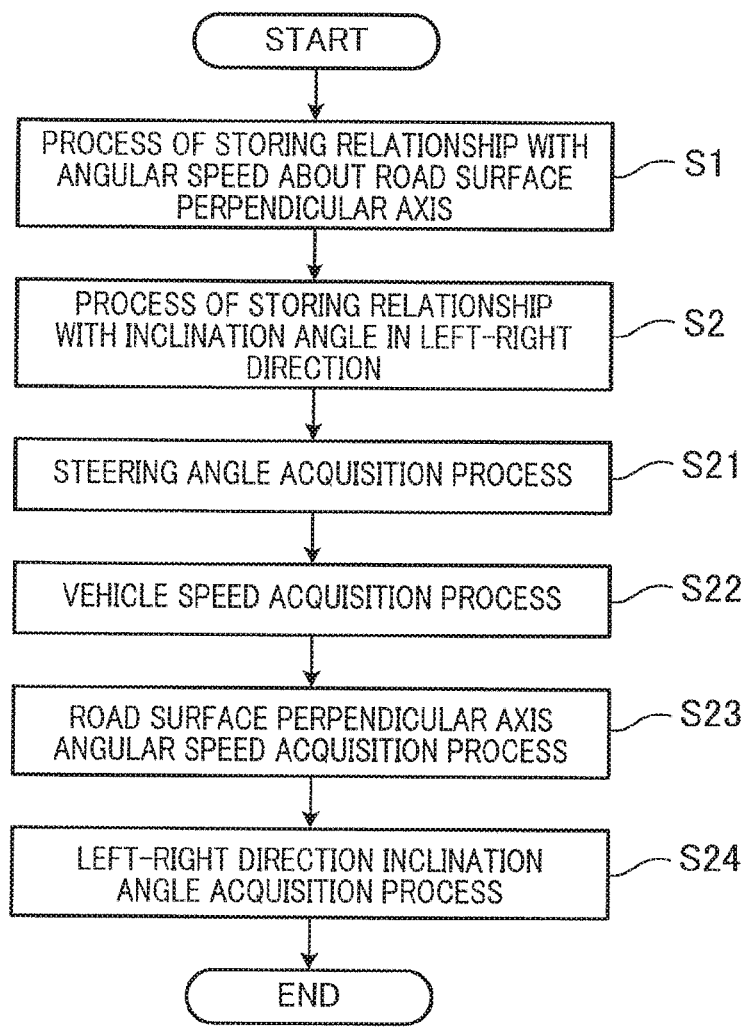
FIG. 20 is a flow chart of steps of a process executed by the angular speed acquisition device for acquiring the angular speed about the road surface perpendicular axis of the leaning vehicle of First Specific Example of the embodiment of the present teaching.

Steps of a process executed by the angular speed acquisition device 20 for acquiring angular speed about the road surface perpendicular axis of the leaning vehicle will be described with reference to FIG. 20.

To begin with, the memory 27 stores the relationship between steering angle, vehicle speed, and angular speed $\omega$ about the road surface perpendicular axis in advance (S1). Furthermore, the memory 27 stores the relationship between steering angle, vehicle speed, and inclination angle in the left-right direction in advance (S2).

The processor 20a then acquires a steering angle signal from the steering angle sensor 30 (steering angle acquisition process S21).

Furthermore, the processor 20a acquires a vehicle speed signal from the vehicle speed sensor 33 (vehicle speed acquisition process S22).

Subsequently, with reference to the relationship between steering angle, vehicle speed, and angular speed about the road surface perpendicular axis stored in the memory 27, the processor 20a acquires the angular speed about the road surface perpendicular axis, which corresponds to the steering angle signal acquired in the steering angle acquisition process S21 and the vehicle speed signal acquired in the vehicle speed acquisition process S22 (road surface perpendicular axis angular speed acquisition process S23).

Furthermore, with reference to the relationship between steering angle, vehicle speed, and inclination angle in the left-right direction stored in the memory 27, the processor 20a acquires the inclination angle in the left-right direction, which corresponds to the steering angle signal acquired in the steering angle acquisition process S21 and the vehicle speed signal acquired in the vehicle speed acquisition process S22 (left-right direction inclination angle acquisition process S24).

<Relationship of Input and Output of Signal of Angular Speed Acquisition Device 20 for Acquiring Angular Speed About Road Surface Perpendicular Axis of Leaning Vehicle>

Figure 6:
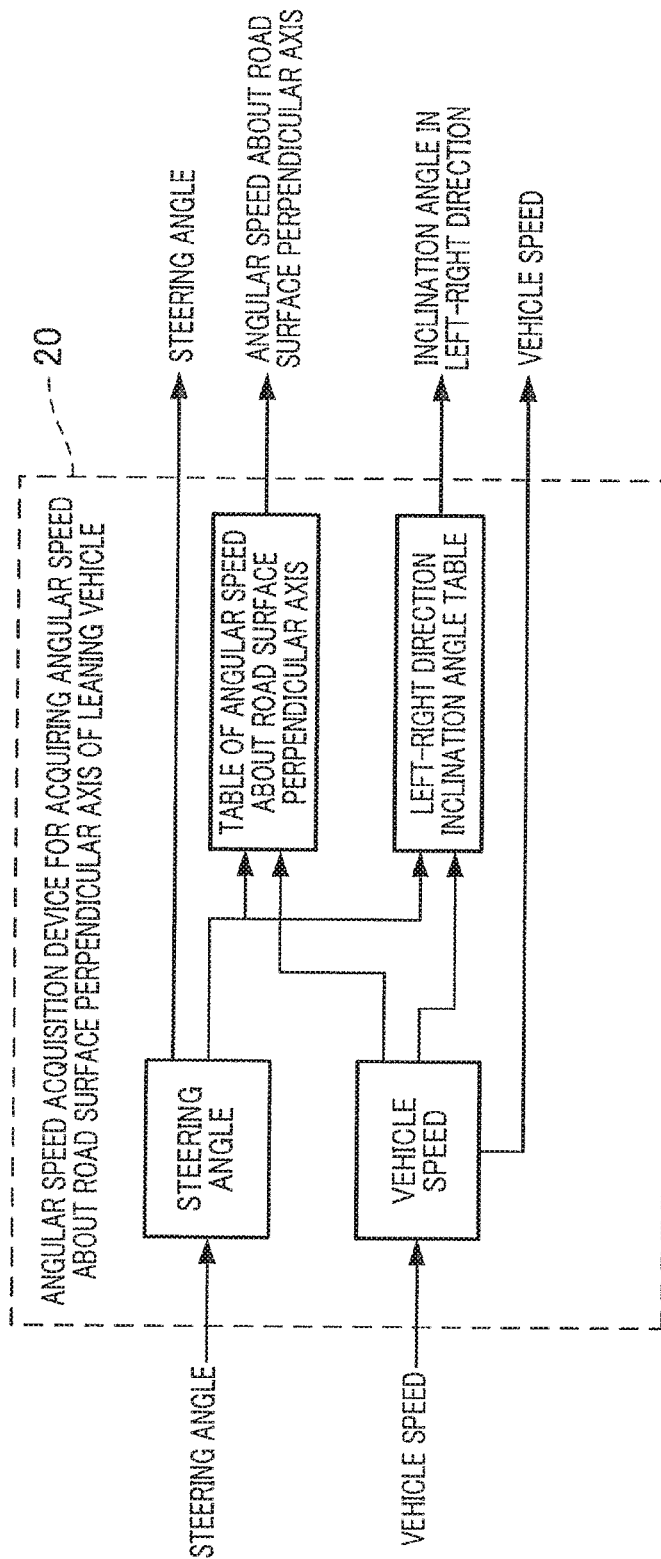
FIG. 6 shows a signal which is input to and output from the angular speed acquisition device for acquiring the angular speed about the road surface perpendicular axis of the leaning vehicle, which is mounted on the motorcycle of FIG. 2.

The following will describe the relationship of input and output of a signal of the angular speed acquisition device 20 for acquiring angular speed about the road surface perpendicular axis of the leaning vehicle. As shown in FIG. 6, a signal related to a steering angle transmitted from the steering angle sensor 30 is input to the angular speed acquisition device 20 for acquiring angular speed about the road surface perpendicular axis of the leaning vehicle. Furthermore, a signal related to vehicle speed transmitted from the vehicle speed sensor 33 is input to the angular speed acquisition device 20 for acquiring angular speed about the road surface perpendicular axis of the leaning vehicle.

The steering angle acquisition unit 21 of the angular speed acquisition device 20 for acquiring angular speed about the road surface perpendicular axis of the leaning vehicle acquires a signal related to a steering angle transmitted from the steering angle sensor 30. The signal related to the steering angle transmitted from the steering angle sensor 30 is equivalent to the steering angle signal of the present teaching. The vehicle speed acquisition unit 22 of the angular speed acquisition device 20 for acquiring angular speed about the road surface perpendicular axis of the leaning vehicle acquires a signal related to vehicle speed transmitted from the vehicle speed sensor 33. In this case, a signal related to the vehicle speed transmitted from the vehicle speed sensor 33 is equivalent to the vehicle speed signal of the present teaching.

The memory 27 of the angular speed acquisition device 20 for acquiring angular speed about the road surface perpendicular axis of the leaning vehicle stores in advance the table of the angular speed about the road surface perpendicular axis (FIG. 7A), which indicates the relationship between steering angle, vehicle speed, and angular speed about the road surface perpendicular axis. Furthermore, the memory 27 of the angular speed acquisition device 20 for acquiring angular speed about the road surface perpendicular axis of the leaning vehicle stores in advance the left-right direction inclination angle table (FIG. 7B), which indicates the relationship between steering angle, vehicle speed, and inclination angle in the left-right direction.

The road surface perpendicular axis angular speed acquisition unit 23 of the angular speed acquisition device 20 for acquiring angular speed about the road surface perpendicular axis of the leaning vehicle acquires angular speed about the road surface perpendicular axis from the acquired steering angle signal and vehicle speed signal, with reference to the table of the angular speed about the road surface perpendicular axis. The left-right direction inclination angle acquisition unit 24 of the angular speed acquisition device 20 for acquiring angular speed about the road surface perpendicular axis of the leaning vehicle acquires an inclination angle in the left-right direction corresponding to the acquired steering angle signal and vehicle speed signal, with reference to the left-right direction inclination angle table. The angular speed about the road surface perpendicular axis, which is acquired by the road surface perpendicular axis angular speed acquisition unit 23, is output from the angular speed acquisition device 20 for acquiring angular speed about the road surface perpendicular axis of the leaning vehicle to an output target. The inclination angle in the left-right direction, which is acquired by the left-right direction inclination angle acquisition unit 24, is output from the angular speed acquisition device 20 for acquiring angular speed about the road surface perpendicular axis of the leaning vehicle to the output target. The steering angle acquired by the steering angle acquisition unit 21 is output from the angular speed acquisition device 20 for acquiring angular speed about the road surface perpendicular axis of the leaning vehicle to the output target. The vehicle speed acquired by the vehicle speed acquisition unit 22 is output from the angular speed acquisition device 20 for acquiring angular speed about the road surface perpendicular axis of the leaning vehicle to the output target. The output target is, for example, the controller 50. The output target may or may not be included in the angular speed acquisition device 20 for acquiring angular speed about the road surface perpendicular axis of the leaning vehicle.

<Use of Angular Speed About Road Surface Perpendicular Axis and Inclination Angle in Left-Right Direction of Leaning Vehicle>

The angular speed about the road surface perpendicular axis of the leaning vehicle and the inclination angle in the left-right direction, which are acquired by the angular speed acquisition device 20 for acquiring angular speed about the road surface perpendicular axis of the leaning vehicle, are output to the controller 50 which is an output target, for example. In this case, the angular speed about the road surface perpendicular axis of the leaning vehicle, which is acquired by the angular speed acquisition device 20 for acquiring angular speed about the road surface perpendicular axis of the leaning vehicle, is used for the following objects, for example. The controller 50 may, for example, calculate an angle about the road surface perpendicular axis by integrating the acquired angular speed about the road surface perpendicular axis with a predetermined time. The angle about the road surface perpendicular axis is a variation in the traveling direction of the motorcycle 1 per the predetermined time. The controller 50 may estimate a location after the predetermined time elapses, based on the angle about the road surface perpendicular axis, the vehicle speed, and the current location of the motorcycle 1. The controller 50 may, for example, use the calculated angle about the road surface perpendicular axis for changing the illumination angle of a headlight of the motorcycle 1. In this case, when the motorcycle 1 is turning, the controller 50 changes the illumination angle of the headlight to the calculated angle about the road surface perpendicular axis. Furthermore, the controller 50 may, for example, use the acquired angle about the road surface perpendicular axis for controlling the engine, the brake, and/or the transmission. To be more specific, the controller 50 may use the acquired angular speed about the road surface perpendicular axis for a stability control system of the motorcycle 1. In this case, when the motorcycle 1 is turning, the controller 50 changes an engine output of the motorcycle 1 based on the calculated angle about the road surface perpendicular axis.

The inclination angle in the left-right direction, which is acquired by the angular speed acquisition device 20 for acquiring angular speed about the road surface perpendicular axis of the leaning vehicle, is output to the controller 50 which is an output target, for example. In this case, the inclination angle in the left-right direction of the leaning vehicle, which is acquired by the angular speed acquisition device 20 for acquiring angular speed about the road surface perpendicular axis of the leaning vehicle, is used for the following objects, for example. The controller 50 may, for example, use the acquired inclination angle in the left-right direction for controlling the engine, the brake, and/or the transmission. Furthermore, for example, the controller 50 may use the acquired inclination angle in the left-right direction for controlling a leaning mechanism connecting two front wheels in a leaning vehicle in which the front wheel unit has two front wheels.

As such, the angular speed about the road surface perpendicular axis of the leaning vehicle and the inclination angle in the left-right direction, which are acquired by the angular speed acquisition device 20 for acquiring angular speed about the road surface perpendicular axis of the leaning vehicle, are easily utilized after being output to the controller 50. To be more specific, the output angular speed about the road surface perpendicular axis of the leaning vehicle and the output inclination angle in the left-right direction are, at the controller 50, easily utilized for controlling the motorcycle 1, for example. Because the angular speed about the road surface perpendicular axis of the motorcycle 1 and the inclination angle in the left-right direction can be easily utilized, post-processing of the output angular speed about the road surface perpendicular axis of the motorcycle 1 and the output inclination angle in the left-right direction can be easily done. Because the post-processing of the output angular speed about the road surface perpendicular axis of the motorcycle 1 and the output inclination angle in the left-right direction can be easily done, the hardware resource of the controller 50 to which the angular speed about the road surface perpendicular axis of the motorcycle 1 and the output inclination angle in the left-right direction are output can be reduced.

<Study on Validity of Steering Compatible Model>

The following will study the validity of the above-described steering compatible model in a detailed manner.

In the steering compatible model, the leaning vehicle is modeled with the assumption that a change of angular speed about the road surface perpendicular axis and a change of inclination angle in the left-right direction are not delayed from a change of steering angle. In the steering compatible model, furthermore, the modeling is performed so that angular speed about the road surface perpendicular axis and an inclination angle in the left-right direction are uniquely determined. To put it differently, the steering compatible model does not have dynamics and is represented as 2-input 1-output maps Y and W as indicated by expressions 1 and 2.

$$Y:(\delta, v) \rightarrow \omega \quad \text{(Expression 1)}$$

$$W:(\delta, v) \rightarrow \omega \quad \text{(Expression 2)}$$

In Expression 1, δ indicates steering angle, v indicates vehicle speed, ω indicates angular speed about the road surface perpendicular axis, and θ indicates inclination angle in the left-right direction.

In the steering compatible model, a table is derived by analysis using simulation software. The simulation software may be general-purpose simulation software by which behavior of a leaning vehicle is analyzed.

In the analysis of behavior of the motorcycle 1 using the simulation software, a steering angle during regular circular turning, a steady-state value of angular speed about the road surface perpendicular axis, and a steady-state value of an inclination angle in the left-right direction were calculated. The steady-state value is a constant value. The behavior of the motorcycle 1 was analyzed at each of vehicle speeds V1 to V6 which were set with a predetermined vehicle speed interval (e.g., vehicle speed 5 km/h). The vehicle speeds V1 to V6 were in ascending order. Simulation results are show in FIG. 7A and FIG. 7B. FIG. 7A shows results of plotting steady-state values of steering angles during regular circular turning and steady-state values of angular speeds about the road surface perpendicular axis, which were calculated at each of the vehicle speeds V1 to V6. In FIG. 7A, the horizontal axis indicates steering angle (deg) whereas the vertical axis indicates angular speed (deg/s) about the road surface perpendicular axis. FIG. 7B shows results of plotting steady-state values of steering angles during regular circular turning and steady-state values of inclination angles in the left-right direction, which were calculated at each of the vehicle speeds V1 to V6. In FIG. 7B, the horizontal axis indicates steering angle (deg) whereas the vertical axis indicates inclination angle (deg) in the left-right direction. In FIG. 7A and FIG. 7B, anticlockwise rotation of the steering angle is regarded as positive rotation for the driver of the motorcycle 1 looking in the traveling direction. Anticlockwise rotation of the angular speed about the road surface perpendicular axis is regarded as positive rotation when the ground is viewed from above. The direction in which the ground is viewed from above is along the road surface perpendicular direction. Anticlockwise rotation of the inclination angle in the left-right direction is regarded as positive rotation when the motorcycle is viewed in the traveling direction. The inclination angles in the left-right direction shown in FIG. 7B are negative values. In HG 7A and FIG. 7B, when the vehicle speed is low (e.g., the vehicle speed V1), the behavior of the motorcycle 1 is changed. On this account, angular speed about the road surface perpendicular axis and an inclination angle in the left-right direction may be estimated based on the acquired steady-state value of the steering angle. In other words, when the vehicle speed is low, values plotted in HG 7A and FIG. 7B may not be identical with values calculated by actual simulation.

As shown in FIG. 7A, the relationship between steering angle and angular speed about the road surface perpendicular axis is monotonic increase. As shown in FIG. 7B, the relationship between steering angle and inclination angle in the left-right direction is monotonic decrease. To put it differently, the simulation software of the steering compatible model is able to express the relationship between steering angle, vehicle speed, and angular speed about the road surface perpendicular axis as a table shown in FIG. 7A. Furthermore, the simulation software of the steering compatible model is able to express the relationship between steering angle, vehicle speed, and inclination angle in the left-right direction as a table shown in FIG. 7B.

In addition to the above, frequency analysis of the steering compatible model was performed using simulation software.

Figure 8A:
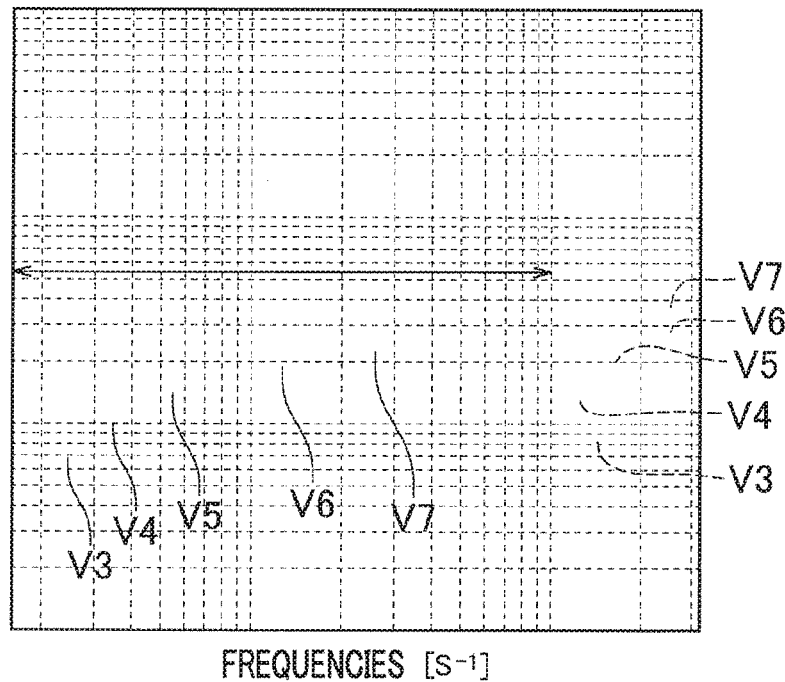
FIG. 8A is a graph showing a gain ratio of a steering angle to angular speed about a road surface perpendicular axis relative to a frequency input of steering torque.
Figure 8B:
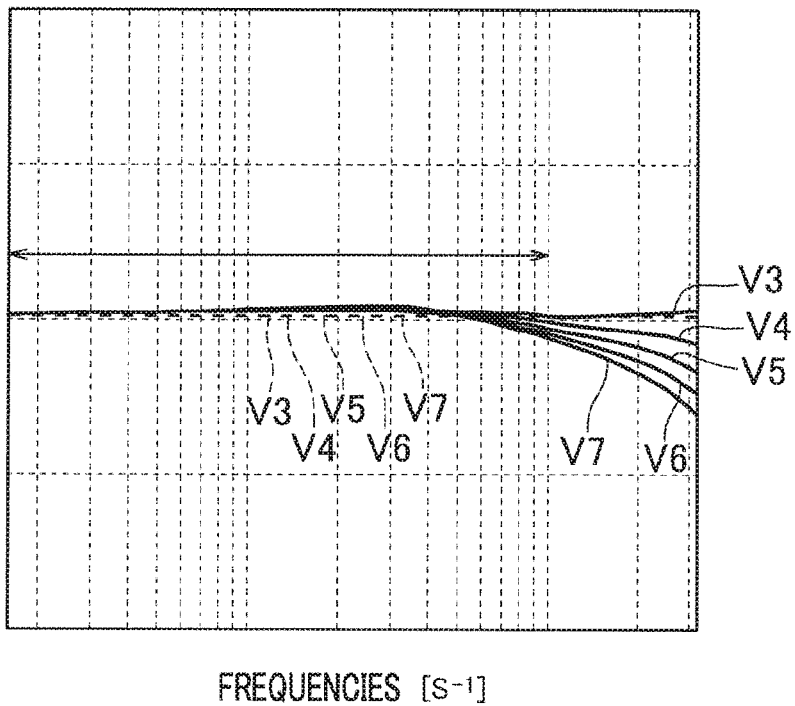
FIG. 8B is a graph showing a phase difference between a steering angle and angular speed about a road surface perpendicular axis relative to a frequency input of steering torque.
Figure 9A:
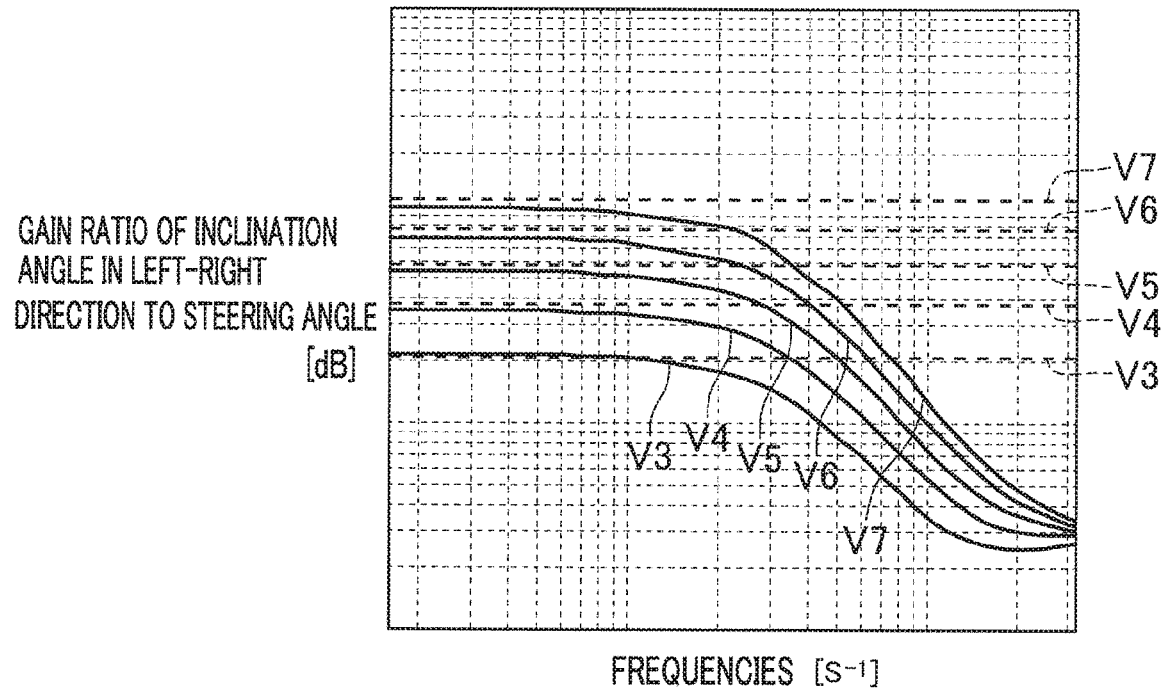
FIG. 9A is a graph showing a gain ratio of a steering angle to an inclination angle in the left-right direction relative to a frequency input of steering torque.
Figure 9B:
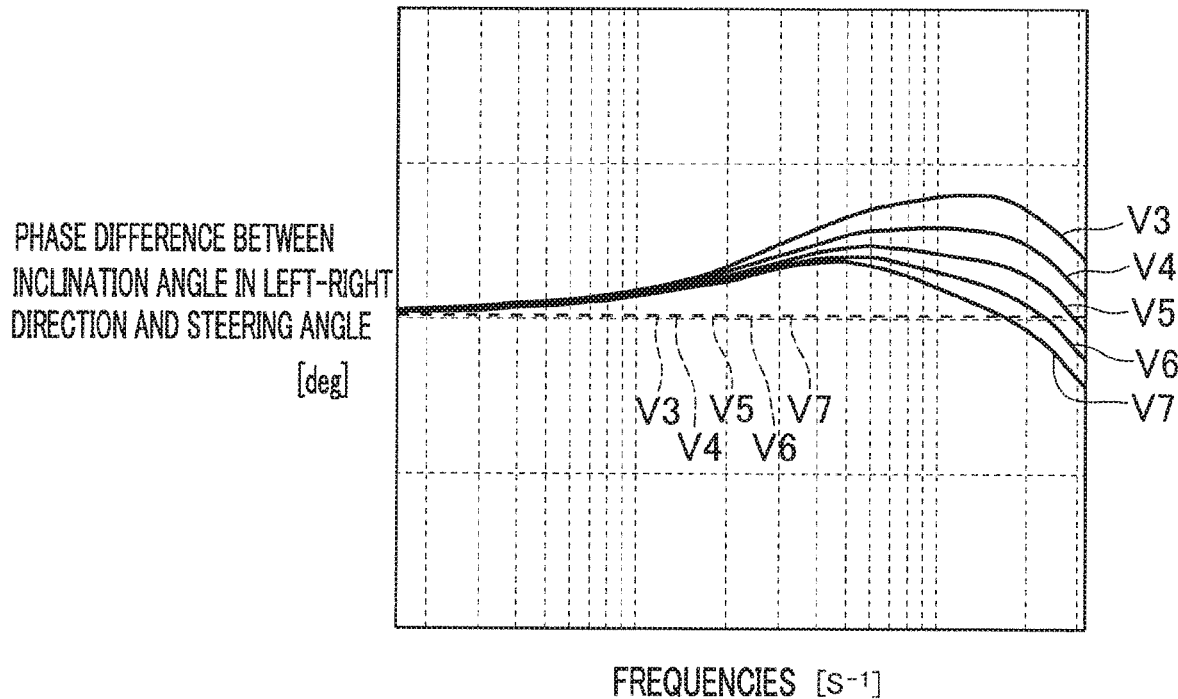
FIG. 9B is a graph showing a phase difference between a steering angle and an inclination angle in the left-right direction relative to a frequency input of steering torque.

In the frequency analysis, an input is a steering torque whereas outputs are a steering angle, angular speed about the road surface perpendicular axis, and an inclination angle in the left-right direction. The steering torque is torque about the rotational axis of the steering shaft 4b. Because the steering angle, the angular speed about the road surface perpendicular axis, and the inclination angle in the left-right direction are output as states, it is impossible to perform direct frequency analysis of the steering compatible model. The frequency analysis was therefore performed by the following steps. To begin with, a model of the motorcycle 1 created by the simulation software was linear-approximated in an upright state, and a linearized model expressing a state equation was derived. Using a steering torque as an input of the state equation, Bode plots of steering angle, angular speed about the road surface perpendicular axis, and inclination angle in the left-right direction were depicted. By using these Bode plots, a gain rate and a phase difference of each of the angular speed about the road surface perpendicular axis relative to the steering angle and the inclination angle in the left-right direction relative to the steering angle were indirectly calculated for each of the vehicle speeds V3 to V6. The results are shown in FIG. 8A, FIG. 8B, FIG. 9A, and FIG. 9B. FIG. 8A is a graph showing a gain ratio of steering angle to angular speed about the road surface perpendicular axis relative to a frequency input of steering torque. FIG. 8B is a graph showing a phase difference between steering angle and angular speed about the road surface perpendicular axis relative to a frequency input of steering torque. FIG. 9A is a graph showing a gain ratio of steering angle to inclination angle in the left-right direction relative to a frequency input of steering torque. FIG. 9B is a graph showing a phase difference between steering angle and inclination angle in the left-right direction relative to a frequency input of steering torque. In FIG. 8A, FIG. 8B, FIG. 9A, and FIG. 9B, full lines are calculation results of the linearized model, whereas dotted lines are calculation results of the steering compatible model.

As shown in FIG. 8A, FIG. 8B, FIG. 9A, and FIG. 9B, the calculation results are constant values (steady-state values) in all frequency bands in the steering compatible model, because the model does not have dynamics. As shown in FIG. 8A and FIG. 8B, in regard to the angular speed about the road surface perpendicular axis, in both the gain ratio and the phase difference, the calculation results of the linearized model more or less coincide with the steady-state values of the steering compatible model, in a relatively large area of frequencies (area indicated by arrows in FIG. 8A and FIG. 8B). As shown in FIG. 9A and FIG. 9B, in regard to the inclination angle in the left-right direction, the calculation results of the linearized model are more or less coincide with the steady-state values of the steering compatible model, in a relatively narrow area of low frequencies (area indicated by arrows in FIG. 9A and FIG. 9B). In the area of low frequencies, the steering angle changes relatively slowly. The results in FIG. 8A, FIG. 8B, FIG. 9A, and FIG. 9B indicate that angular speed about the road surface perpendicular axis and an inclination angle in the left-right direction can be calculated by using the steering compatible model, particularly in an area in which input of the steering angle changes relatively slowly. An example of the case where input of the steering angle changes relatively slowly in the running motorcycle 1 is a case where the motorcycle 1 turns right or left at a crossroad. When the motorcycle 1 actually runs, however, input of the steering angle may not change relatively slowly, and the frequency may not be constant. Under this circumstance, a running test of regular circular turning was performed by using an actual motorcycle 1a, and the tables shown in FIG. 7A and FIG. 7B were verified. The motorcycle 1a is identical with the motorcycle 1 of the present embodiment except that the motorcycle 1a is provided with an IMU.

Figures 10, 11:
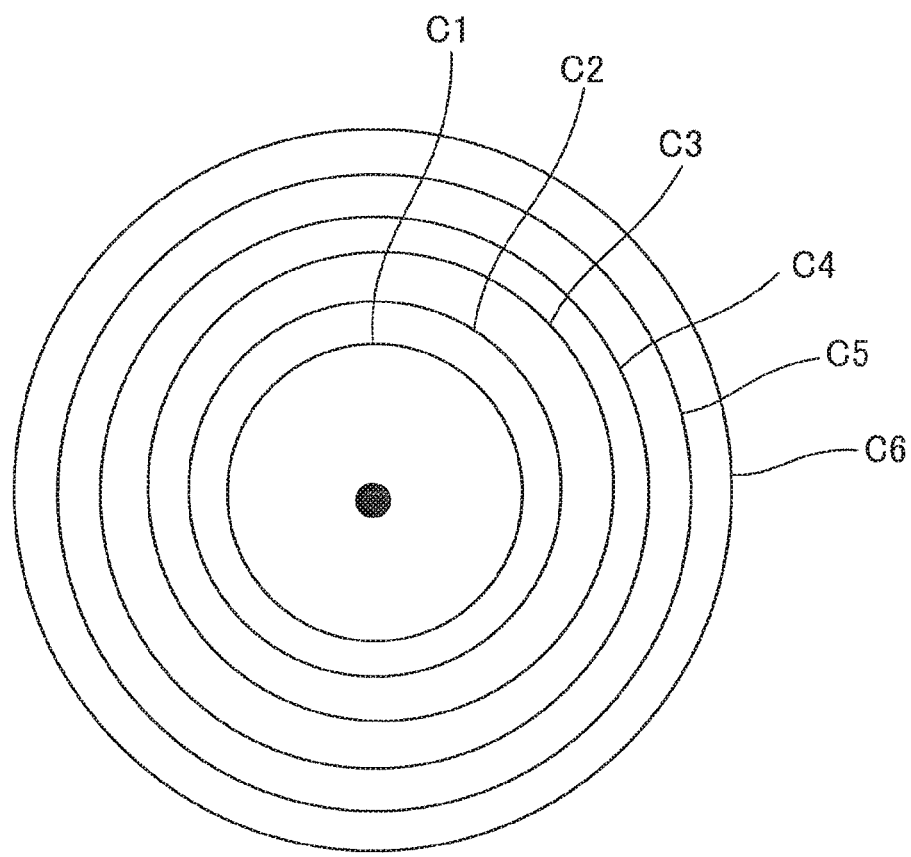
FIG. 10 is a table showing running patterns of running tests in which a motorcycle 1 performs regular circular turning.
FIG. 11 shows circles used in the running patterns.

The running test of the regular circular turning using the motorcycle 1a was performed with plural running patterns. The running patterns were different from one another in vehicle speed and circle. The running patterns tested are indicated by circle symbols in FIG. 10. As shown in FIG. 10, vehicle speeds used in the running patterns were five vehicle speeds V1, V2, V3, V5, and V7. As shown in FIG. 10, the circles used in the running patterns were six circles C1 to C6 which were different in size. A comparison of the sizes of the circles C1 to C6 used in the running patterns is shown in FIG. 11. C1 to C6 are in ascending order of the size. While the circles C1 to C6 are concentric in FIG. 10, the circles C1 to C6 may not be concentric in the running tests. In the running tests, the motorcycle 1a ran in such a way that one front wheel of the front wheel unit 2 ran along each of the circles C1 to C6 shown in FIG. 11. Furthermore, the motorcycle 1a ran at one of the vehicle speeds V1, V2, V3, V5, and V7 with a constant steering angle. Running tests were not performed for the running patterns without circle symbols in FIG. 10, because of the following reasons. Firstly, in regard to the vehicle speeds V1 and V2, the behavior may change when the motorcycle 1a runs on a large circle at low vehicle speed. Secondly, in regard to the vehicle speeds V5 and V7, the inclination angle in the left-right direction of the motorcycle 1a may be excessively large when the motorcycle 1a runs on a small circle at high speed.

In the running tests of the regular circular turning, the motorcycle 1a having the IMU was used. Basically, the motorcycle 1a encompasses all features of the motorcycle 1 of the embodiment of the present teaching described above. It is noted that items identical with those of the motorcycle 1 of the embodiment of the present teaching are indicated by the same reference numerals and detailed descriptions thereof are suitably omitted. The IMU is supported by the vehicle body frame 4 of the motorcycle 1a. The IMU is an apparatus by which the posture and traveling direction of the motorcycle 1 are measured. The IMU includes at least a three-axis gyroscope and a three-directional accelerometer. The IMU acquires three-axis angles or angular acceleration of the motorcycle 1a and three-directional acceleration of the motorcycle 1a. The three-directional acceleration of the motorcycle 1a is acceleration in the front-rear direction (FFBF direction) of the vehicle body frame 4 of the motorcycle 1a, acceleration in the left-right direction (LFRF direction) of the vehicle body frame 4, and acceleration in the up-down direction (UFDF direction) of the vehicle body frame 4. The three axes of the motorcycle 1a are a yaw axis, a roll axis, and a pitch axis of the motorcycle 1a. The yaw axis of the motorcycle 1a extends in the up-down direction (UFDF direction) of the vehicle body frame 4. The roll axis of the motorcycle 1a extends in the front-rear direction (FFBF direction) of the vehicle body frame 4. The pitch axis of the motorcycle 1a extends in the left-right direction (LFRF direction) of the vehicle body frame 4. The three-axis angles are a yaw angle, a roll angle, and a pitch angle of the motorcycle 1a. The three-axis angular speed is a yaw rate, a roll rate, and a pitch rate of the motorcycle 1a. The yaw angle, the roll angle, and the pitch angle of the motorcycle 1a are rotation angles about the yaw axis, the roll axis, and the pitch axis of the motorcycle 1a. The yaw rate, the roll rate, and the pitch rate of the motorcycle 1a are angular speeds about the yaw axis, the roll axis, and the pitch axis of the motorcycle 1a. The roll angle of the motorcycle 1a is inclination angle of inclination of the vehicle body frame 4 in the vehicle left-right direction (LR direction). The roll angle is equivalent to the inclination angle in the left-right direction of the present teaching.

Figure 12:
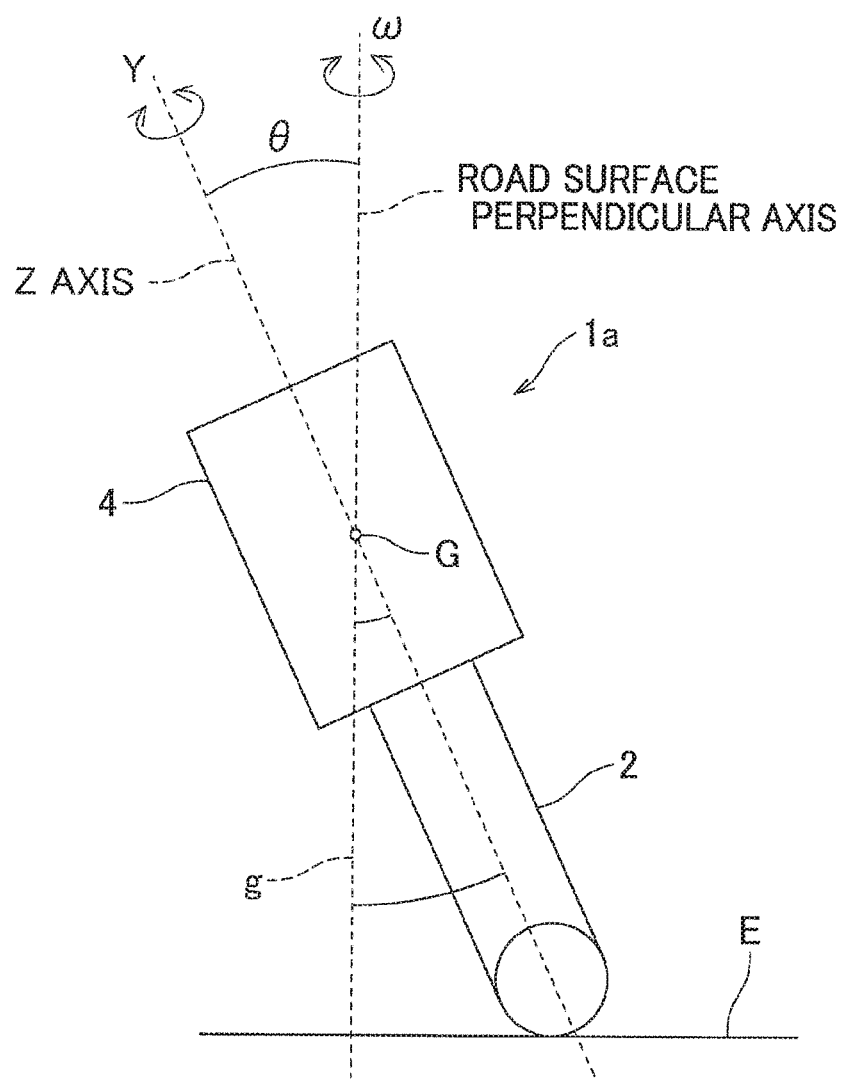
FIG. 12 illustrates an inclination angle between a fixed axis of a vehicle body frame of the motorcycle of FIG. 2 in a lean state and a perpendicular axis.

To be more specific, the motorcycle 1a leans as shown in FIG. 12 while the motorcycle 1a is turning. In FIG. 12, the fixed axis of the vehicle body frame 4 is a Z axis passing the center of gravity G of the motorcycle 1a. The road surface perpendicular axis perpendicular to the road surface E is a g axis. When the motorcycle 1a is turning, the motorcycle 1a runs while rotating about the road surface perpendicular axis which is perpendicular to the road surface E. The angular speed about the road surface perpendicular axis of the motorcycle 1a is co. The yaw rate of the motorcycle 1a is angular speed of rotation about the Z axis which is the fixed axis of the vehicle body frame 4, and is Y. The roll angle of the motorcycle 1a is an angle θ at which the Z axis is inclined in the vehicle left-right direction relative to the road surface perpendicular axis.

Figure 13A:
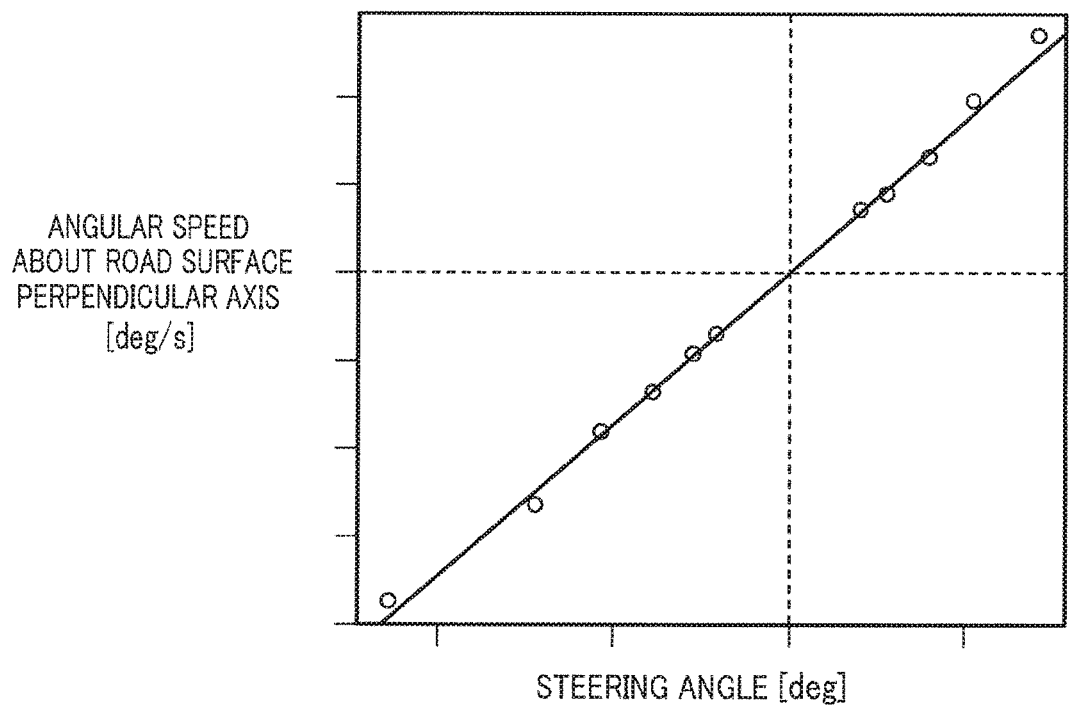
FIG. 13A is a graph showing an example of a running test result of angular speed about a road surface perpendicular axis and an inclination angle in the left-right direction.
Figure 13B:
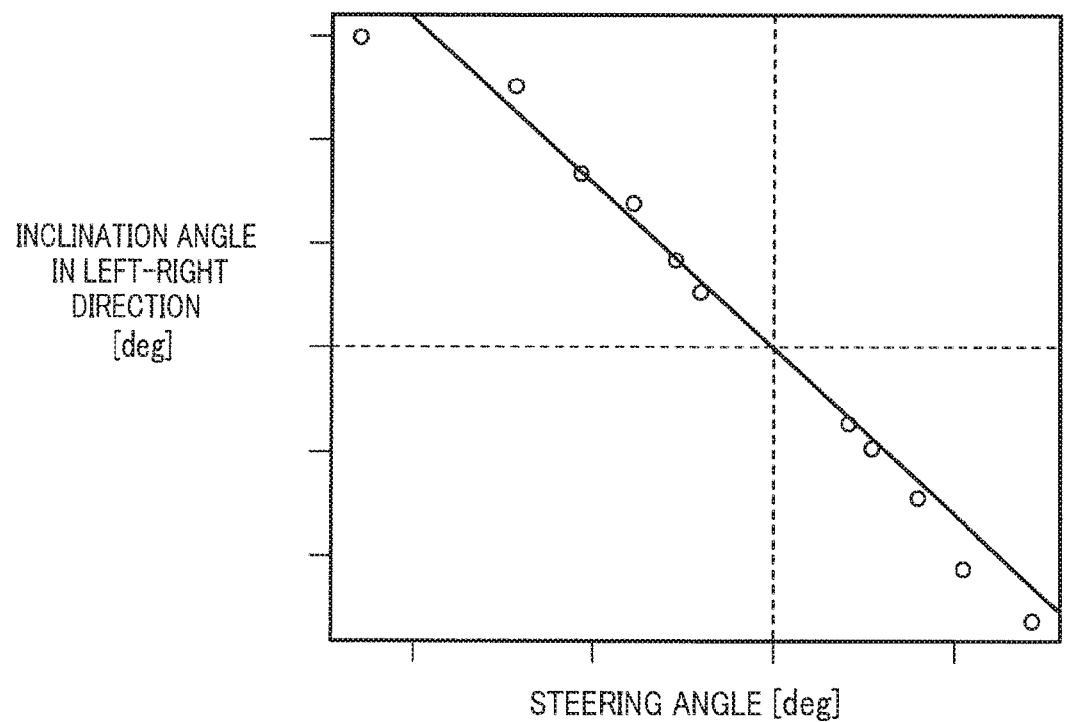
FIG. 13B is a graph showing an example of a running test result of angular speed about a road surface perpendicular axis and an inclination angle in the left-right direction.

In the running tests of the regular circular turning, the regular circular turning was performed by running the motorcycle 1a both in clockwise and in anticlockwise, in order to eliminate an influence of an error due to offset of the IMU, etc. In the running tests of the regular circular turning, an average of angular speeds about the road surface perpendicular axis and an average of inclination angles in the left-right direction, which were measured by the IMU during a predetermined time (e.g., about 30 seconds) in which the regular circular turning was continued, were regarded as running test results of the angular speed about the road surface perpendicular axis and the inclination angle in the left-right direction. The running tests of the regular circular turning may be performed in a lean-with state and at constant vehicle speed V, regardless of the pitching of the motorcycle 1a and the thickness of the tires. The lean-with state is a state in which the Z axis which is the fixed axis of the vehicle body frame 4 and the upper half of the body of the driver are on the same linear line. The angular speed about the road surface perpendicular axis of the motorcycle 1a is calculated based on the yaw rate and the roll angle of the motorcycle 1a, which are measured by the IMU. The inclination angle in the left-right direction of the motorcycle 1a is the roll angle of the motorcycle 1a measured by the IMU. Each of FIG. 13A and FIG. 13B shows an example of a running test result of angular speed about the road surface perpendicular axis and inclination angle in the left-right direction. FIG. 13A shows the relationship between steering angle in regular circular turning at predetermined vehicle speed (V3) and angular speed about the road surface perpendicular axis. FIG. 13B shows the relationship between steering angle in regular circular turning at predetermined vehicle speed (V3) and inclination angle in the left-right direction. In FIG. 13A and FIG. 13B, running test results are indicated by circle symbols. In FIG. 13A and FIG. 13B, furthermore, linear lines are approximation straight lines calculated from the running test results based on a least-squares method. FIG. 13A and FIG. 13B show that, in the regular circular turning, angular speed about the road surface perpendicular axis and an inclination angle in the left-right direction have linear relationship with a steering angle. This means that, in the regular circular turning, the table shown in FIG. 7A properly indicates the relationship between steering angle, vehicle speed, and angular speed about the road surface perpendicular axis. Furthermore, in the regular circular turning, the table shown in FIG. 7B properly indicates the relationship between steering angle, vehicle speed, and inclination angle in the left-right direction.

Figure 14:
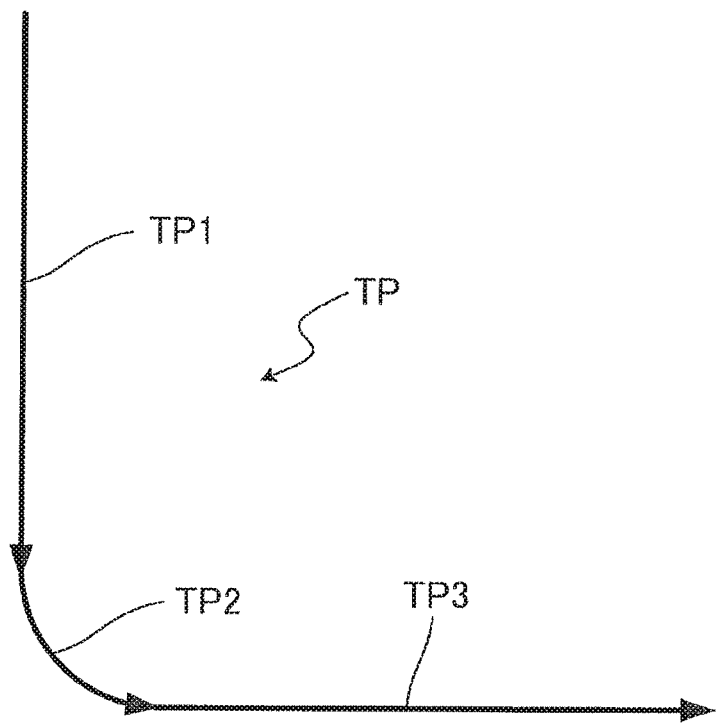
FIG. 14 shows a running locus of the motorcycle 1 in a running test in which the motorcycle 1 turns left at a crossroad.
Figure 15A:
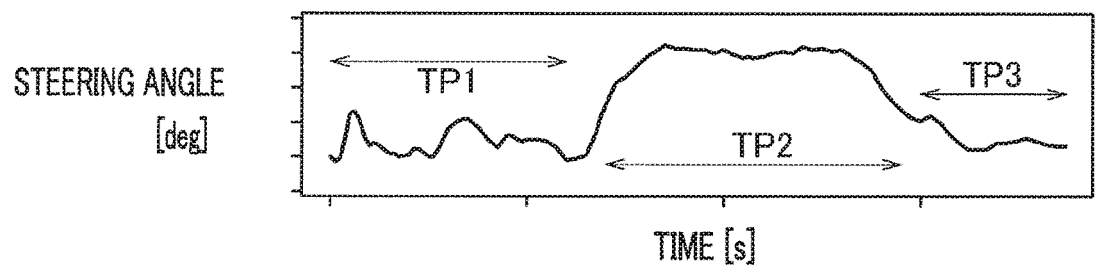
FIG. 15A is a graph showing a result of the running test of turning left at the crossroad.
Figure 15B:
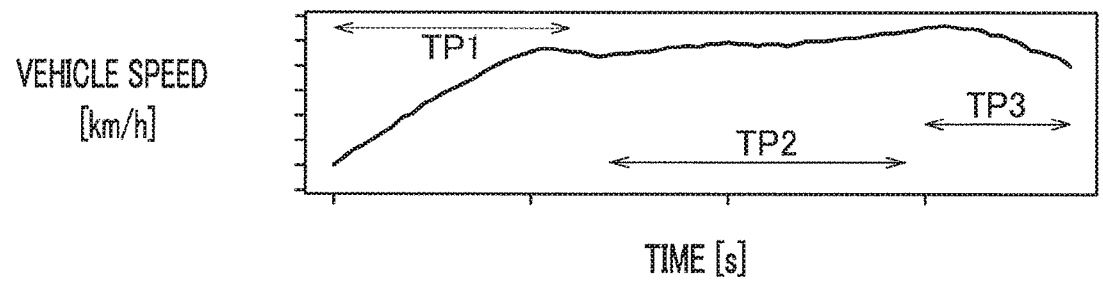
FIG. 15B is a graph showing a result of the running test of turning left at the crossroad.
Figure 15C:
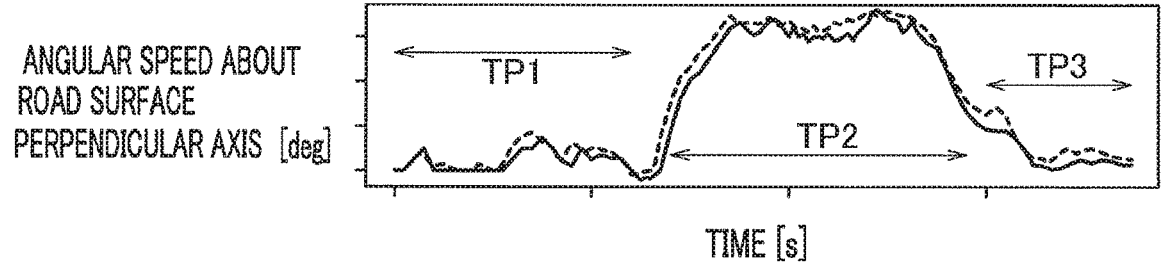
FIG. 15C is a graph showing a result of the running test of turning left at the crossroad.
Figure 15D:
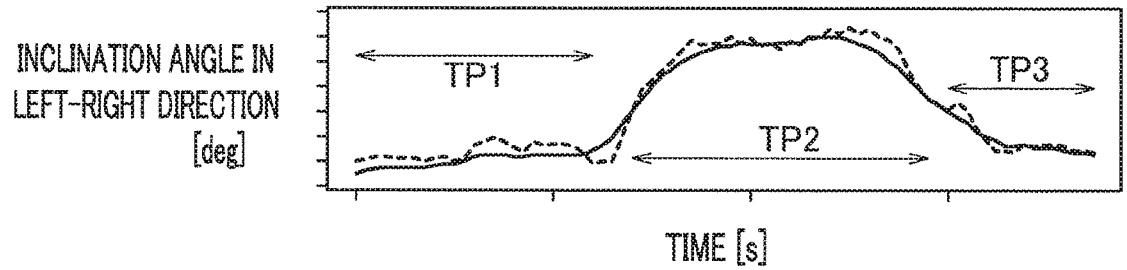
FIG. 15D is a graph showing a result of the running test of turning left at the crossroad.

In addition to the above, a running test when turning right or left at a crossroad was performed using the motorcycle 1a having the IMU. To be more specific, a running test was performed when turning left at a crossroad, as indicated by the running locus shown in FIG. 14. As shown in FIG. 14, the running locus of the running test when turning left at the crossroad has three running locus parts TP1 to TP3. The running locus part TP1 and the running locus part TP3 are linear running locus parts. The running locus part TP2 is a curved running locus part. In the running test of turning left, the motorcycle 1 passed the running locus parts TP1 to TP3 in this order, and the steering angle, the vehicle speed, the angular speed about the road surface perpendicular axis, and the inclination angle in the left-right direction were measured. Measurement results of the steering angle, the vehicle speed, the angular speed about the road surface perpendicular axis, and the inclination angle in the left-right direction are indicated by full lines in FIG. 15A to FIG. 15D. In the running test of turning left, the motorcycle 1 passed the running locus parts TP1 to TP3 in this order, and the angular speed about the road surface perpendicular axis and the inclination angle in the left-right direction were calculated based on measurement results of the steering angle and the vehicle speed and the tables shown in FIG. 7A and FIG. 7B. The calculation results of the angular speed about the road surface perpendicular axis and the inclination angle in the left-right direction are indicated by dotted lines in FIG. 15A to FIG. 15D. FIG. 15A shows a measurement result of the steering angle. FIG. 15B shows a measurement result of the vehicle speed. FIG. 15C shows a measurement result and a calculation result of the angular speed about the road surface perpendicular axis. FIG. 15D shows a measurement result and a calculation result of the inclination angle in the left-right direction. The three arrows in each of FIG. 15A to FIG. 15D indicate times during which the motorcycle runs at the running locus parts TP1 to TP3, respectively. FIG. 15C shows that, in regard to the angular speed about the road surface perpendicular axis, the measurement result is substantially identical with the calculation result. Furthermore, FIG. 15D shows that, in regard to the inclination angle in the left-right direction, the calculation result and the measurement result are substantially approximated even though the calculation result is slightly delayed from the measurement result. This means that, in the regular circular turning, the table shown in FIG. 7A substantially precisely indicates the relationship between steering angle, vehicle speed, and angular speed about the road surface perpendicular axis. Furthermore, in the regular circular turning, the table shown in FIG. 7B substantially precisely indicates the relationship between steering angle, vehicle speed, and inclination angle in the left-right direction.

The angular speed acquisition device 20 for acquiring angular speed about the road surface perpendicular axis of the leaning vehicle of First Specific Example of the embodiment of the present teaching exerts the following effects, in addition to the above-described effects of the angular speed acquisition device 20 for acquiring angular speed about the road surface perpendicular axis of the leaning vehicle of the embodiment of the present teaching.

The angular speed acquisition device 20 for acquiring angular speed about the road surface perpendicular axis of the leaning vehicle acquires an angular speed about the road surface perpendicular axis of the motorcycle 1. The road surface perpendicular axis is an axis g which is perpendicular to the road surface on which the motorcycle 1 runs. The angular speed acquisition device 20 for acquiring angular speed about the road surface perpendicular axis of the leaning vehicle can be mounted on the motorcycle 1. The motorcycle 1 includes the vehicle body frame 4, the front wheel unit 2, the rear wheel unit 3, and the steering shaft 4b. The front wheel unit 2 includes one front wheel. The rear wheel unit 3 includes one rear wheel. The vehicle body frame 4 is structured to lean rightward when turning right and lean leftward when turning left. The front wheel unit 2 is supported by the vehicle body frame 4. The rear wheel unit 3 is provided rearward of the front wheel unit 2 in the vehicle front-rear direction. The rear wheel unit 3 is supported by the vehicle body frame 4. The steering shaft 4b steers the front wheel unit 2.

The angular speed acquisition device 20 for acquiring angular speed about the road surface perpendicular axis of the leaning vehicle includes the steering angle acquisition unit 21, the vehicle speed acquisition unit 22, the road surface perpendicular axis angular speed acquisition unit 23, and the memory 27. The memory 27 stores the relationship between steering angle, vehicle speed, and angular speed about the road surface perpendicular axis in advance. The steering angle acquisition unit 21 acquires a signal related to a steering angle which is a rotation angle about the rotational axis of the steering shaft 4b as a steering angle signal. The vehicle speed acquisition unit 22 acquires a signal related to vehicle speed of the motorcycle 1 as a vehicle speed signal. Based on the relationship between steering angle, vehicle speed, and angular speed about the road surface perpendicular axis stored in the memory 27, the road surface perpendicular axis angular speed acquisition unit 23 acquires the angular speed about the road surface perpendicular axis from the steering angle signal acquired by the steering angle acquisition unit 21 and the vehicle speed signal acquired by the vehicle speed acquisition unit 22. Because the memory 27 stores the relationship between steering angle, vehicle speed, and angular speed about the road surface perpendicular axis, the angular speed about the road surface perpendicular axis is acquired when the steering angle and the vehicle speed are determined. The steering angle acquisition unit 21 and the vehicle speed acquisition unit 22 are therefore able to easily acquire the steering angle signal and the vehicle speed signal. To put it differently, the road surface perpendicular axis angular speed acquisition unit 23 is able to easily acquire the angular speed about the road surface perpendicular axis, based on the steering angle signal and the vehicle speed signal which can be easily acquired. The angular speed acquisition device 20 for acquiring angular speed about the road surface perpendicular axis of the leaning vehicle is therefore able to easily acquire the angular speed about the axis perpendicular to the road surface of the motorcycle 1.

In addition to the above, the memory 27 stores the relationship between steering angle, vehicle speed, and angular speed about the road surface perpendicular axis as a table (table of the angular speed about the road surface perpendicular axis). When the motorcycle 1 runs along a circle at constant vehicle speed, the steering angle and the angular speed about the road surface perpendicular axis are arranged to be constant. As the size of the circle and the constant vehicle speed of the motorcycle 1 are changed, it is possible to acquire steering angles and the angular speeds about the road surface perpendicular axis. The table of the angular speed about the road surface perpendicular axis is determined by the steering angles and the angular speeds about the road surface perpendicular axis, which are acquired by causing the motorcycle 1 to run along circles with different sizes at different constant vehicle speeds. The angular speed acquisition device 20 for acquiring angular speed about the road surface perpendicular axis of the leaning vehicle is therefore able to acquire the angular speed about the axis in the direction perpendicular to the road surface of the motorcycle 1, based on the table of the angular speed about the road surface perpendicular axis, the vehicle speed signal acquired by the steering angle acquisition unit 21, and the steering angle signal acquired by the vehicle speed acquisition unit 22. The angular speed acquisition device 20 for acquiring angular speed about the road surface perpendicular axis of the leaning vehicle is therefore able to easily acquire the angular speed about the axis perpendicular to the road surface of the motorcycle 1.

Furthermore, the memory 27 stores the relationship between steering angle, vehicle speed, and inclination angle in the left-right direction in advance. The left-right direction inclination angle acquisition unit 24 acquires an inclination angle in the left-right direction based on the relationship between steering angle, vehicle speed, and inclination angle in the left-right direction stored in the memory 27, a steering angle signal acquired by the steering angle acquisition unit 21, and a vehicle speed signal acquired by the vehicle speed acquisition unit 22. The angular speed acquisition device 20 for acquiring angular speed about the road surface perpendicular axis of the leaning vehicle is therefore able to acquire an inclination angle in the vehicle left-right direction relative to the road surface perpendicular direction of the fixed axis of the vehicle body frame 4, based on the relationship between steering angle, vehicle speed, and inclination angle in the left-right direction, a vehicle speed signal, and a steering angle signal.

In addition to the above, the memory 27 stores the relationship between steering angle, vehicle speed, and inclination angle in the left-right direction as a table (left-right direction inclination angle table). When the motorcycle 1 runs along a circle at constant vehicle speed, the steering angle and the inclination angle in the left-right direction are arranged to be constant. As the size of the circle and the constant vehicle speed of the motorcycle 1 are changed, it is possible to acquire steering angles and inclination angles in the left-right direction. The left-right direction inclination angle table is determined by the steering angles and the inclination angles in the left-right direction, which are acquired by causing the motorcycle 1 to run along circles with different sizes at different constant vehicle speeds. The angular speed acquisition device 20 for acquiring angular speed about the road surface perpendicular axis of the leaning vehicle is therefore able to acquire the angle at which the fixed axis of the vehicle body frame 4 is inclined in the vehicle left-right direction relative to the road surface perpendicular direction, based on the left-right direction inclination angle table, the vehicle speed signal acquired by the steering angle acquisition unit 21, and the steering angle signal acquired by the vehicle speed acquisition unit 22.

Second Specific Example

Figure 16:
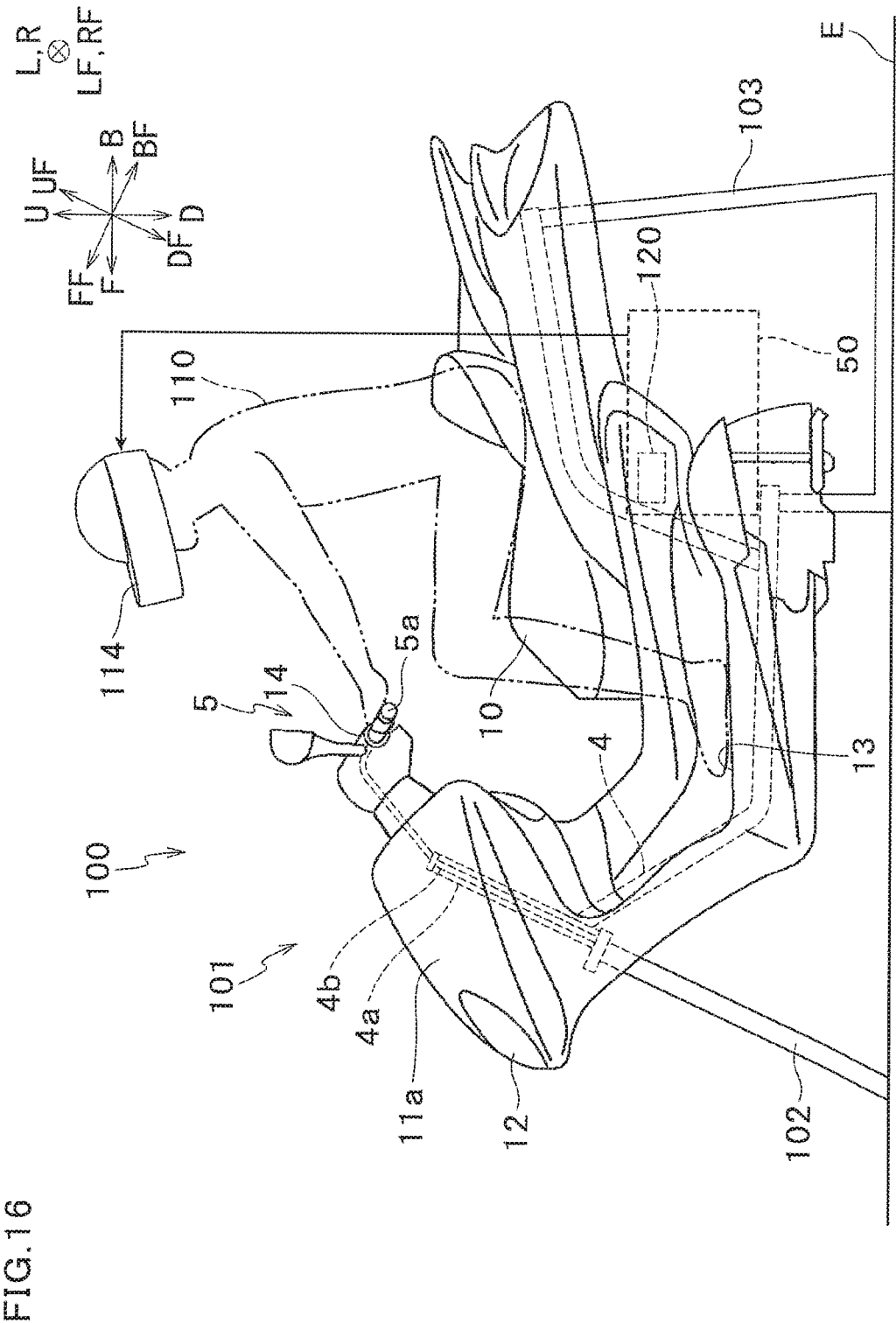
FIG. 16 is a left side view schematically showing a riding simulator of a leaning vehicle on which an angular speed acquisition device for acquiring angular speed about a road surface perpendicular axis of a leaning vehicle of Second Specific Example of the embodiment of the present teaching is mounted.

Second Specific Example of the embodiment of the present teaching will be described with reference to FIG. 16 to FIG. 18. As shown in FIG. 16, an angular speed acquisition device 120 for acquiring angular speed about the road surface perpendicular axis of a leaning vehicle is applicable to a riding simulator 100 of the leaning vehicle. It is noted that items identical with those in the embodiment of the present teaching having been described above are not explained again. Basically, Second Specific Example of the embodiment of the present teaching encompasses all features of the embodiment of the present teaching and First Specific Example described above. Items identical with those of the First Specific Example of the embodiment of the present teaching are indicated by the same reference numerals and detailed descriptions thereof are suitably omitted.

<Overall Structure of Riding Simulator 100 of Leaning Vehicle>

The riding simulator 100 of the leaning vehicle includes a motorcycle 101. The motorcycle 101 is a simulated body of the motorcycle 1 and is a modification of the above-described motorcycle 1. The motorcycle 101 includes a vehicle body frame 4. The motorcycle 101 does not include the front wheel unit 2 and the rear wheel unit 3 that the motorcycle 1 includes. The riding simulator 100 of the leaning vehicle includes front wheel fixing units 102 and a rear wheel fixing unit 103 which restrict movement of the motorcycle 101 on a simulated road surface E in the front-rear direction, the left-right direction, and the up-down direction. The floor on which the riding simulator 100 is mounted is the simulated road surface E. Hereinafter, the floor on which the riding simulator 100 is mounted may be referred to as a road surface E.

A head pipe 4a is provided at a front portion of the vehicle body frame 4. A steering shaft 4b is rotatably inserted into the head pipe 4a. An upper end portion of this steering shaft 4b is connected to a handle unit 5. The handle unit 5 is supported by the head pipe 4a to be rotatable about the steering shaft 4b. As a driver steers the handle unit 5, the steering shaft 4b is rotated. A spring and a damper are provided in the handle unit 5 to cause a left grip 5a and a right grip 5b to return to the neutral point when the handle unit 5 is not steered by the driver. At the neutral point, the left grip 5a and the right grip 5b are positioned so that the traveling direction of the motorcycle 101 is parallel to the vehicle front-rear direction.

Upper end portions of paired left and right front wheel fixing units 102 are fixed to the handle unit 5. The front wheel fixing units 102 are fixed to the road surface E and support a front portion of the motorcycle 101. The front wheel fixing units 102 restrict movement of the front portion of the motorcycle 101 in the front-rear direction, the left-right direction, and the up-down direction. Even if the handle unit 5 is steered, the fixed axis of the vehicle body frame 4 does not lean relative to the vehicle left-right direction (RL direction) of the motorcycle 1, on account of the front wheel fixing units 102.

The rear wheel fixing unit 103 is attached to a rear portion of the vehicle body frame 4. The rear wheel fixing unit 103 is fixed to the road surface E and supports the rear portion of the motorcycle 101. The rear wheel fixing unit 103 restricts movement of the rear portion of the motorcycle 101 in the front-rear direction, the left-right direction, and the up-down direction.

The vehicle body frame 4 supports a seat 10. The motorcycle 101 does not include the engine unit 8 and the fuel tank 9 that the motorcycle 1 includes. The vehicle body frame 4 is at least partially covered with a vehicle body cover 11. A headlight 12 is provided in the front cowling 11a. The headlight 12 may not be provided. Step boards 13 are provided at a lower left portion and a lower right portion of the motorcycle 101, respectively. The shape of the vehicle body frame 4 of the motorcycle 101 may be different from the shape of the vehicle body frame 4 of the motorcycle 1.

The handle unit 5 includes a left grip 5a and a right grip 5b. The right grip 5b is an accelerator grip. The opening degree of a throttle valve is changed in the simulation as the driver operates the accelerator grip 5b. The motorcycle 101 does not include the front brake 2a and the rear brake 3a that the motorcycle 1 includes. A right brake lever 5c is provided in front of the right grip 5b. As the driver operates the right brake lever 5c, the front brake is activated in the simulation. In the simulation, the front brake is activated only by an operation of the right brake lever 5c, and is not provided in the motorcycle 101. A front brake driving unit is not provided in the motorcycle 101. A left brake lever 5d is provided in front of the left grip 5a. As the driver operates the left brake lever 5d, the rear brake is activated in the simulation. In the simulation, the rear brake is activated only by an operation of the left brake lever 5d, and is not provided in the motorcycle 101. A rear brake driving unit is not provided in the motorcycle 101.

A display 14 is provided in front of the handle unit 5 and behind the front cowling 11a. The display 14 may not be provided. The handle unit 5 is provided with switches. Power supply from the battery to electric device can be started or stopped by a switch operation in the simulation. Furthermore, the riding simulator 100 of the leaning vehicle can be activated or stopped by a switch operation. Furthermore, a screen on the display 14 or a later-described display 114 is switchable by a switch operation.

The display 114 is a head mounted display. The display 114 is a display mounted on the head of a driver 110 seated on the seat 10 of the motorcycle 101. A virtual three-dimensional space generated by a later-described screen generator 25 is displayed on the display 114. Contents displayed on the head mounted display may be changed in accordance with the position and/or direction of the face. Space saving is achieved when the display 114 is a head mounted display. Furthermore, because contents displayed on the head mounted display can be changed in accordance with the position and/or direction of the face, the field of vision is sufficiently wide. Alternatively, the display 114 may be a display having a screen provided in front of the motorcycle 101.

Figure 17:
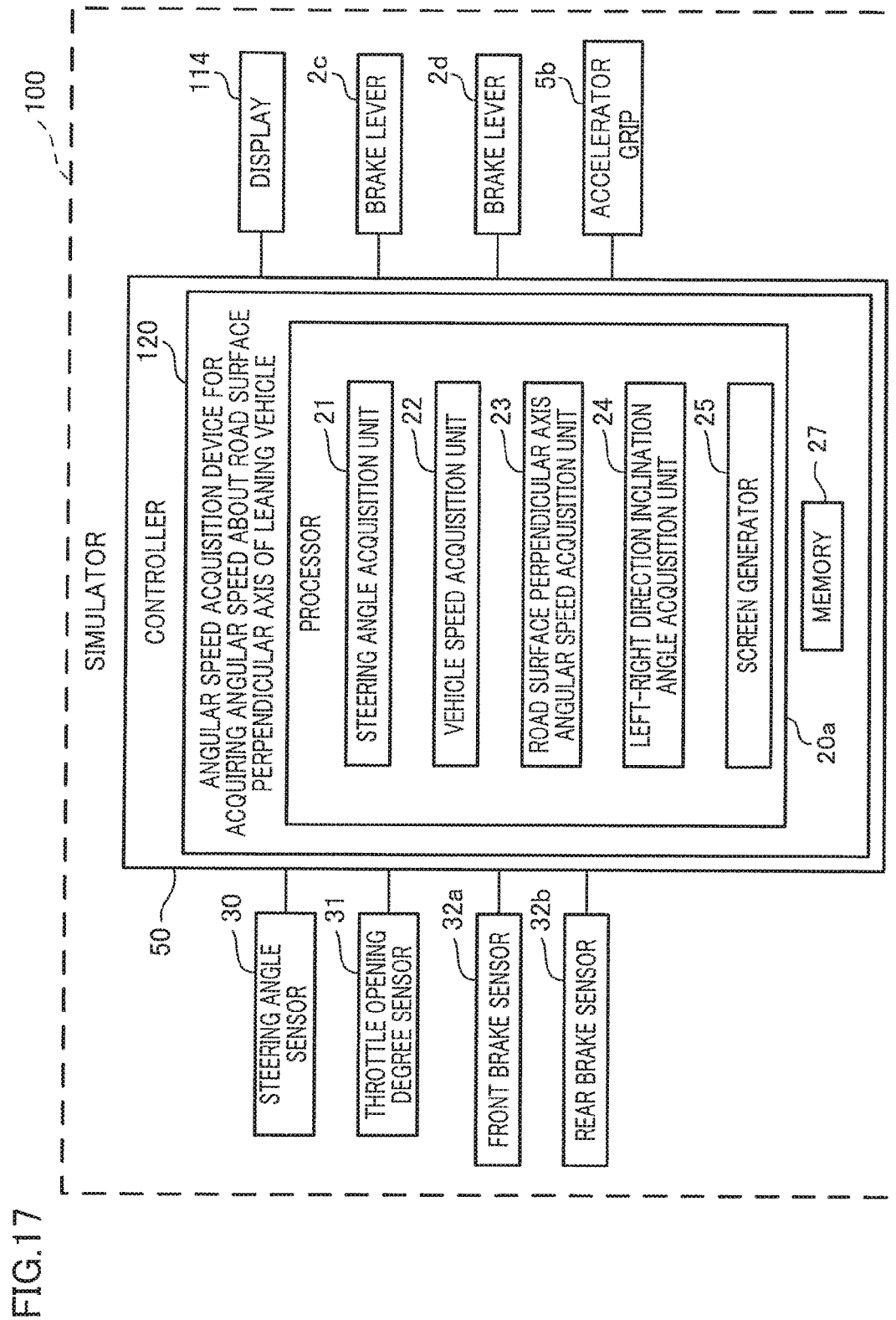
FIG. 17 is a control block diagram of the riding simulator of the leaning vehicle of FIG. 16.
Figure 18:
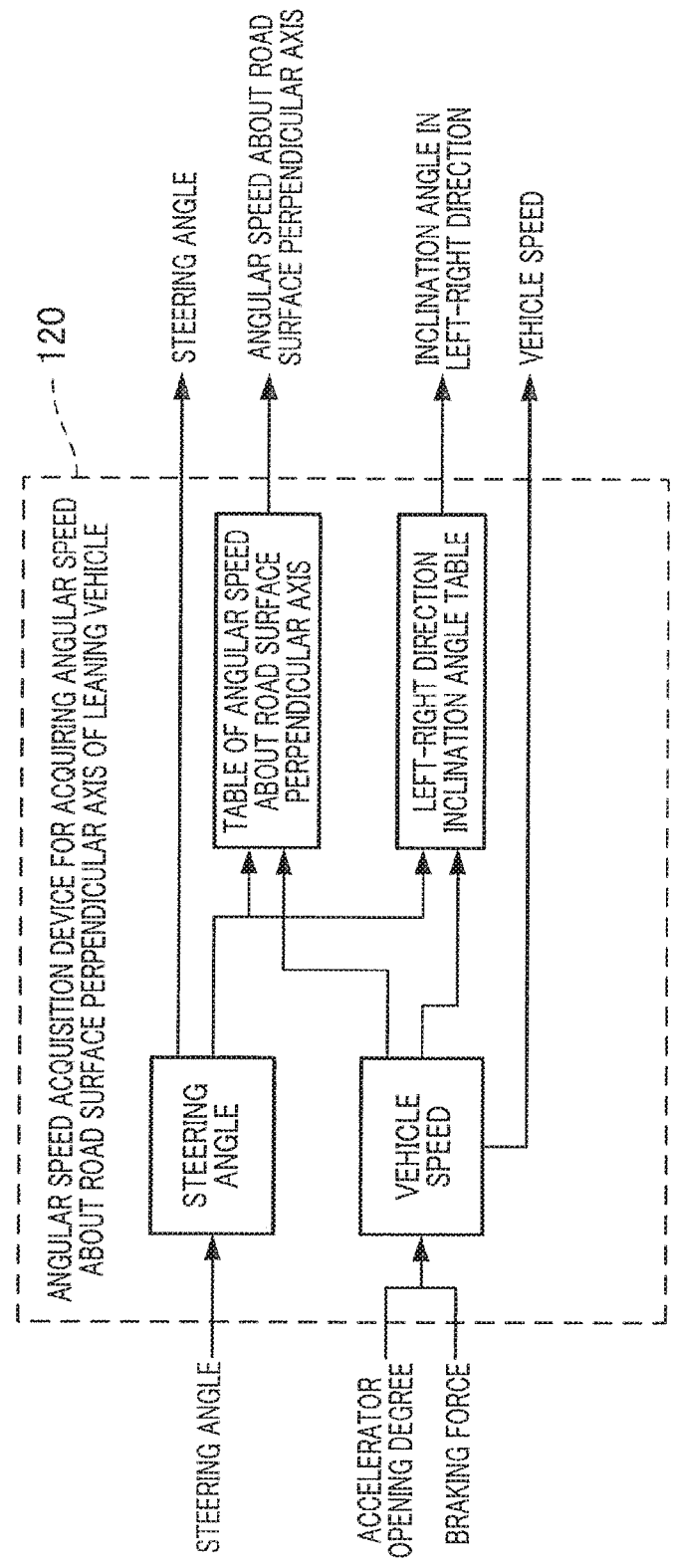
FIG. 18 shows a signal input to and output from the angular speed acquisition device for acquiring the angular speed about the road surface perpendicular axis of the leaning vehicle applied to the riding simulator for the leaning vehicle shown in FIG. 16.

As shown in FIG. 17, the motorcycle 101 includes a steering angle sensor 30, a throttle opening degree sensor 31, a front brake sensor 32a, and a rear brake sensor 32b. The angular speed acquisition device 120 for acquiring angular speed about the road surface perpendicular axis of the leaning vehicle is connected, via a controller 50, to the steering angle sensor 30, the throttle opening degree sensor 31, the front brake sensor 32a, and the rear brake sensor 32b. The steering angle sensor 30 is configured to detect the rotation angle of the steering shaft 4b about the rotational axis. A throttle opening degree sensor 31a is connected to the accelerator grip 5b. The throttle opening degree sensor 31a is configured to detect the opening degree of the accelerator grip 5b operated by the driver and to output a signal indicating the accelerator opening degree. The front brake sensor 32a is connected to the right brake lever 5c. The front brake sensor 32a is configured to detect pressure of the right brake operated by the driver and output a signal indicating front brake pressure. The rear brake sensor 32b is connected to a rear brake lever 5d. The rear brake sensor 32b is configured to detect pressure of the left brake operated by the driver and output a signal indicating rear brake pressure. The motorcycle 101 does not include the vehicle speed sensor 33 that the motorcycle 1 includes. The motorcycle 101 does not include the wireless communication apparatus 34 that the motorcycle 1 includes.

The motorcycle 101 includes a controller 50. The controller 50 is connected to the above-described sensors 30 to 33. The controller 50 includes the angular speed acquisition device 120 for acquiring angular speed about the road surface perpendicular axis of the leaning vehicle. The angular speed acquisition device 120 for acquiring angular speed about the road surface perpendicular axis of the leaning vehicle is not mounted on the motorcycle 101. The angular speed acquisition device 120 for acquiring angular speed about the road surface perpendicular axis of the leaning vehicle may be mounted on the motorcycle 101.

<Structure of Angular Speed Acquisition Device 120 for Acquiring Angular Speed About Road Surface Perpendicular Axis of Leaning Vehicle>

The angular speed acquisition device 120 for acquiring angular speed about the road surface perpendicular axis of the leaning vehicle includes the processor 20a and the memory 27, as described above.

The memory 27 stores the relationship between steering angle, vehicle speed, and angular speed about the road surface perpendicular axis of the motorcycle 1 in advance. Furthermore, the memory 27 stores the relationship between steering angle, vehicle speed, and inclination angle in the left-right direction of the motorcycle 1 in advance. The relationship between steering angle, vehicle speed, and angular speed about the road surface perpendicular axis is determined by a constant steering angle and angular speed about the road surface perpendicular axis, which are measured when the motorcycle 1 runs on a circle at a constant vehicle speed. The relationship between steering angle, vehicle speed, and inclination angle in the left-right direction is determined by a constant steering angle and inclination angle in the left-right direction, which are measured when the motorcycle 1 runs on a circle at a constant vehicle speed. The relationship between steering angle, vehicle speed, and angular speed about the road surface perpendicular axis is shown in a table of the angular speed about the road surface perpendicular axis in FIG. 7A. The relationship between steering angle, vehicle speed, and inclination angle in the left-right direction is indicated by a left-right direction inclination angle table shown in FIG. 7B.

As function processors, the processor 20a includes a steering angle acquisition unit 21, a vehicle speed acquisition unit 22, a road surface perpendicular axis angular speed acquisition unit 23, and a left-right direction inclination angle acquisition unit 24.

The steering angle acquisition unit 21 acquires a steering angle signal of the motorcycle 101. The steering angle acquisition unit 21 acquires a steering angle signal detected by the steering angle sensor 30.

The vehicle speed acquisition unit 22 acquires vehicle speed signals which are signals related to vehicle speed of the motorcycle 101. The vehicle speed signals of the motorcycle 101 are a signal indicating the accelerator opening degree of the motorcycle 101 and signals indicating front brake pressure and rear brake pressure which are signals indicating the braking force of the motorcycle 101. The signal indicating the accelerator opening degree of the motorcycle 101 is transmitted from the throttle opening degree sensor 31. In this case, the vehicle speed acquisition unit 22 may estimate the opening degree of the throttle valve 18 based on the opening degree of the accelerator grip 5b detected by the throttle opening degree sensor 31. The signal indicating the front brake pressure of the motorcycle 101 is transmitted from the front brake sensor 32a. The signal indicating the rear brake pressure of the motorcycle 101 is transmitted from the rear brake sensor 32b.

The road surface perpendicular axis angular speed acquisition unit 23 acquires angular speed about the road surface perpendicular axis of the motorcycle 101 based on the relationship between steering angle, vehicle speed, and angular speed about the road surface perpendicular axis of the motorcycle 1, a steering angle signal of the motorcycle 101, and vehicle speed signals of the motorcycle 101. A steering angle of the motorcycle 101 is acquired based on a steering angle signal of the motorcycle 101. Vehicle speed of the motorcycle 101 is acquired based on vehicle speed signals of the motorcycle 101. Because the motorcycle 101 is immovable, virtual vehicle speed of the motorcycle 101 is calculated. To be more specific, the road surface perpendicular axis angular speed acquisition unit 23 calculates the vehicle speed of the motorcycle 101 by using the kinetic model in the vehicle front-rear direction of the motorcycle 1 stored in advance. The road surface perpendicular axis angular speed acquisition unit 23 calculates acceleration in the vehicle front-rear direction based on the kinetic model from a signal indicating the accelerator opening degree of the motorcycle 101, a signal indicating the front brake pressure, and a signal indicating the rear brake pressure. The road surface perpendicular axis angular speed acquisition unit 23 then calculates vehicle speed of the motorcycle 101 by integrating the acceleration in the vehicle front-rear direction. Subsequently, with reference to the table of the angular speed about the road surface perpendicular axis shown in FIG. 7A, angular speed about the road surface perpendicular axis of the motorcycle 101, which corresponds to the acquired steering angle of the motorcycle 101 and the calculated vehicle speed of the motorcycle 101, is acquired.

The left-right direction inclination angle acquisition unit 24 is configured to acquire an inclination angle in the left-right direction based on the relationship between steering angle, vehicle speed, and inclination angle in the left-right direction of the motorcycle 1, a steering angle signal of the motorcycle 101, and a vehicle speed signal of the motorcycle 101. To begin with, the steering angle of the motorcycle 101 is acquired based on a steering angle signal of the motorcycle 101. Furthermore, the vehicle speed of the motorcycle 101 is calculated based on a vehicle speed signal of the motorcycle 101. To be more specific, the road surface perpendicular axis angular speed acquisition unit 23 calculates the vehicle speed of the motorcycle 101 by using the kinetic model in the vehicle front-rear direction of the motorcycle 1 stored in advance. The left-right direction inclination angle acquisition unit 24 calculates acceleration in the vehicle front-rear direction based on the kinetic model from a signal indicating the accelerator opening degree of the motorcycle 101, a signal indicating the front brake pressure, and a signal indicating the rear brake pressure. The left-right direction inclination angle acquisition unit 24 then calculates vehicle speed of the motorcycle 101 by integrating the acceleration in the vehicle front-rear direction. Subsequently, with reference to the left-right direction inclination angle table shown in FIG. 7B, an inclination angle in the left-right direction of the motorcycle 101, which corresponds to the acquired steering angle of the motorcycle 101 and the calculated vehicle speed of the motorcycle 101, is acquired. It is noted that the inclination angle in the left-right direction is equivalent to the roll angle of the motorcycle 101.

The processor 20a of the angular speed acquisition device 20 for acquiring angular speed about the road surface perpendicular axis of the leaning vehicle includes the screen generator 25 as a function processor. In other words, the angular speed about the road surface perpendicular axis of the leaning vehicle and the inclination angle in the left-right direction, which are acquired by the angular speed acquisition device 20 for acquiring angular speed about the road surface perpendicular axis of the leaning vehicle, are output to the screen generator 25 of the processor 20*a*. The screen generator 25 then integrates, with a predetermined time, angular speed about the road surface perpendicular axis acquired by the road surface perpendicular axis angular speed acquisition unit 23, so as to calculate an angle about the road surface perpendicular axis. The angle about the road surface perpendicular axis is a variation in the traveling direction of the motorcycle 101 per the predetermined time. By using the calculated angle about the road surface perpendicular axis and the vehicle speed acquired by the vehicle speed acquisition unit 22, the screen generator 25 estimates the location of the motorcycle 101 in the virtual three-dimensional space after a predetermined time elapses, based on the current location. Furthermore, the screen generator 25 estimates the environment of the motorcycle 101 and the viewpoint of the driver in the virtual three-dimensional space, by using the inclination angle in the left-right direction acquired by the left-right direction inclination angle acquisition unit 24. The screen generator 25 calculates the location of the motorcycle 101, the environment, the viewpoint of the driver, and other vehicles in the virtual three-dimensional space, and displays them on the display 114.

<Relationship of Input and Output of Signal of Angular Speed Acquisition Device 120 for Acquiring Angular Speed About Road Surface Perpendicular Axis of Leaning Vehicle>

The following will describe the relationship of input and output of a signal of the angular speed acquisition device 120 for acquiring angular speed about the road surface perpendicular axis of the leaning vehicle. As shown in FIG. 18, a signal related to a steering angle transmitted from the steering angle sensor 30 is input to the angular speed acquisition device 120 for acquiring angular speed about the road surface perpendicular axis of the leaning vehicle. The angular speed acquisition device 120 for acquiring angular speed about the road surface perpendicular axis of the leaning vehicle receives a signal indicating the accelerator opening degree of the motorcycle 101 transmitted from the throttle opening degree sensor 31 and signals indicating the braking force of the motorcycle 101 transmitted from the front brake sensor 32*a* and the rear brake sensor 32*b*.

The steering angle acquisition unit 21 of the angular speed acquisition device 120 for acquiring angular speed about the road surface perpendicular axis of the leaning vehicle acquires a signal related to the steering angle transmitted from the steering angle sensor 30. The signal related to the steering angle transmitted from the steering angle sensor 30 is equivalent to the steering angle signal of the present teaching. The vehicle speed acquisition unit 22 of the angular speed acquisition device 120 for acquiring angular speed about the road surface perpendicular axis of the leaning vehicle acquires a signal indicating the accelerator opening degree of the motorcycle 101 transmitted from the throttle opening degree sensor 31 and signals indicating the braking force of the motorcycle 101 transmitted from the front brake sensor 32*a* and the rear brake sensor 32*b*. The vehicle speed acquisition unit 22 calculates a signal related to the vehicle speed based on a signal indicating the accelerator opening degree of the motorcycle 101 and signals indicating the braking force. In this case, the signal related to the vehicle speed signal calculated based on the signal indicating the accelerator opening degree of the motorcycle 101 transmitted from the throttle opening degree sensor 31 and the signals indicating the braking force of the motorcycle 101 transmitted from the front brake sensor 32*a* and the rear brake sensor 32*b* is equivalent to the vehicle speed signal of the present teaching.

The memory 27 of the angular speed acquisition device 120 for acquiring angular speed about the road surface perpendicular axis of the leaning vehicle stores in advance a table of the angular speed about the road surface perpendicular axis (FIG. 7A), which indicates the relationship between steering angle, vehicle speed, and angular speed about the road surface perpendicular axis. Furthermore, the memory 27 of the angular speed acquisition device 120 for acquiring angular speed about the road surface perpendicular axis of the leaning vehicle stores in advance a left-right direction inclination angle table (FIG. 7B), which indicates the relationship between steering angle, vehicle speed, and inclination angle in the left-right direction.

The road surface perpendicular axis angular speed acquisition unit 23 of the angular speed acquisition device 120 for acquiring angular speed about the road surface perpendicular axis of the leaning vehicle acquires angular speed about the road surface perpendicular axis from the acquired steering angle signal and vehicle speed signal, with reference to the table of the angular speed about the road surface perpendicular axis. The left-right direction inclination angle acquisition unit 24 of the angular speed acquisition device 120 for acquiring angular speed about the road surface perpendicular axis of the leaning vehicle acquires an inclination angle in the left-right direction corresponding to the acquired steering angle signal and vehicle speed signal, with reference to the left-right direction inclination angle table. The angular speed about the road surface perpendicular axis, which is acquired by the road surface perpendicular axis angular speed acquisition unit 23, is output from the angular speed acquisition device 120 for acquiring angular speed about the road surface perpendicular axis of the leaning vehicle to an output target. The inclination angle in the left-right direction, which is acquired by the left-right direction inclination angle acquisition unit 24, is output from the angular speed acquisition device 120 for acquiring angular speed about the road surface perpendicular axis of the leaning vehicle to the output target. The steering angle acquired by the steering angle acquisition unit 21 is output from the angular speed acquisition device 120 for acquiring angular speed about the road surface perpendicular axis of the leaning vehicle to the output target. The vehicle speed acquired by the vehicle speed acquisition unit 22 is output from the angular speed acquisition device 120 for acquiring angular speed about the road surface perpendicular axis of the leaning vehicle to the output target. The output target is the screen generator 25 of the processor 20*a*.

The angular speed acquisition device 120 for acquiring angular speed about the road surface perpendicular axis of the leaning vehicle of Second Specific Example of the embodiment of the present teaching exerts the following effects, in addition to the above-described effects of the angular speed acquisition device 20 for acquiring angular speed about the road surface perpendicular axis of the leaning vehicle of the above-described First Specific Example of the embodiment of the present teaching.

The angular speed acquisition device 120 for acquiring angular speed about the road surface perpendicular axis of the leaning vehicle of Second Specific Example is applicable to the riding simulator 100 of the leaning vehicle. The riding simulator 100 of Second Specific Example to which the angular speed acquisition device 120 for acquiring angular speed about the road surface perpendicular axis of the leaning vehicle is applied is able to easily acquire angular speed about the road surface perpendicular axis and an inclination angle in the left-right direction, by utilizing a steering angle and vehicle speed of the motorcycle 101 as inputs. The angular speed about the road surface perpendicular axis of the motorcycle 101 and the inclination angle in the left-right direction, which are acquired by the angular speed acquisition device 120 for acquiring angular speed about the road surface perpendicular axis of the motorcycle 101, are output to the screen generator 25 which is the output target, and are used for analyzing the running state of the motorcycle 101. This allows the driver to quickly get used to the operations of the riding simulator 100 of the motorcycle 101. As such, the angular speed about the road surface perpendicular axis of the motorcycle 101 and the inclination angle in the left-right direction, which are acquired by the angular speed acquisition device 120 for acquiring angular speed about the road surface perpendicular axis of the leaning vehicle, are easily utilized after being output to the screen generator 25 which is the output target. To be more specific, the output angular speed about the road surface perpendicular axis of the leaning vehicle and the output inclination angle in the left-right direction are easily utilized for analyzing the running state of the motorcycle 101 in the riding simulator 100, for example. Because the angular speed about the road surface perpendicular axis of the motorcycle 101 and the inclination angle in the left-right direction can be easily utilized, post-processing of the output angular speed about the road surface perpendicular axis of the motorcycle 101 and the output inclination angle in the left-right direction can be easily done. Because the post-processing of the output angular speed about the road surface perpendicular axis of the motorcycle 101 and the output inclination angle in the left-right direction can be easily done, the hardware resource of the screen generator 25 to which the angular speed about the road surface perpendicular axis of the motorcycle 101 and the output inclination angle in the left-right direction are output can be reduced.

Preferred embodiments of the present teaching have been described above. However, the present teaching is not limited to the above-described embodiments, and various changes can be made within the scope of the claims. Further, modifications described below may be used in combination as needed.

The number of the steering shafts is one in the present embodiment. Alternatively, the number of the steering shafts may be more than one in the present teaching. In the present embodiment, the front wheel unit includes one front wheel. In the present embodiment, the rear wheel unit includes one rear wheel. Alternatively, in the present teaching, the front wheel unit may include two or more front wheels. In the present teaching, the rear wheel unit may include two or more rear wheels. In the present embodiment, the steering shaft steers the front wheel unit. Alternatively, in the present teaching, the steering shaft may steer the rear wheel unit.

In Specific Example 2 of the present embodiment, the screen generator includes, as a function processor, a processor of the angular speed acquisition device for acquiring the angular speed about the road surface perpendicular axis of the leaning vehicle. Alternatively, the screen generator includes, as a function processor, a processor of the controller.

In the present teaching, the relationship between steering angle, vehicle speed, and angular speed about the road surface perpendicular axis is not limited to a table in which the relationship between steering angle and angular speed about the road surface perpendicular axis is indicated by a line for each vehicle speed. For example, as shown in FIG. 19A, the relationship may be indicated by a table showing angular speeds about the road surface perpendicular axis, which correspond to plural vehicle speeds and plural steering angles. In the table shown in FIG. 19A, for example, angular speed about the road surface perpendicular axis is calculated as follows. Vehicle speed acquired from a vehicle speed signal acquired by the vehicle speed acquisition unit is referred to as vehicle speed V. A steering angle acquired from a steering angle signal acquired by the steering angle acquisition unit is referred to as a steering angle S. Calculated angular speed about the road surface perpendicular axis is referred to as angular speed $\omega$ about the road surface perpendicular axis. To begin with, one of the vehicle speeds V11 to V13, which is lower than the vehicle speed V and is closest to the vehicle speed V, is referred to as vehicle speed Vc. In the example shown in FIG. 19A, the vehicle speed Vc is the vehicle speed V11. Meanwhile, one of the vehicle speeds V11 to V13, which is higher than the vehicle speed V and is closest to the vehicle speed V, is referred to as vehicle speed Vd. In the example shown in FIG. 19A, the vehicle speed Vd is the vehicle speed V12. Subsequently, one of the steering angles S11 to S13, which is smaller than the steering angle S and is closest to the steering angle S, is referred to as a steering angle Sc. In the example shown in FIG. 19A, the steering angle Sc is S12. Meanwhile, one of the steering angles S11 to S13, which is larger than the steering angle S and is closest to the steering angle S, is referred to as a steering angle Sd. In the example shown in FIG. 19A, the steering angle Sd is S13. The angular speed about the road surface perpendicular axis at the vehicle speed Vc and the steering angle Sc is referred to as angular speed $\omega c$ about the road surface perpendicular axis. In the example shown in FIG. 19A, the angular speed $\omega c$ about the road surface perpendicular axis is $\omega 21$. The angular speed about the road surface perpendicular axis at the vehicle speed Vd and the steering angle Sd is referred to as angular speed $\omega d$ about the road surface perpendicular axis. In the example shown in FIG. 19A, the angular speed $\omega d$ about the road surface perpendicular axis is $\omega 32$. A difference between the angular speed $\omega c$ about the road surface perpendicular axis and the angular speed $\omega d$ about the road surface perpendicular axis is referred to as a difference $\Delta \omega$ about the road surface perpendicular axis. The ratio of the difference between the vehicle speed Vc and the vehicle speed V to the difference between the vehicle speed Vd and the vehicle speed V is referred to as Rc. The ratio of the difference between the steering angle Sc and the steering angle S to the difference between the steering angle Sd and the steering angle S is referred to as Rd. The angular speed $\omega$ about the road surface perpendicular axis is calculated by adding, to the angular speed $\omega c$ about the road surface perpendicular axis, a value acquired by multiplying the difference $\Delta \omega$ between the angular speeds about the road surface perpendicular axis by an average value of Rc and Rd. The relationship between steering angle, vehicle speed, and angular speed about the road surface perpendicular axis may not be indicated by a table. The relationship between steering angle, vehicle speed, and angular speed about the road surface perpendicular axis may be represented by a mathematical expression, etc.

In the present teaching, the relationship between steering angle, vehicle speed, and angular speed about the road surface perpendicular axis is not limited to a table in which the relationship between steering angle and angular speed about the road surface perpendicular axis is indicated by a line for each vehicle speed. For example, as shown in FIG.

19B, the relationship may be indicated by a table showing inclination angles in the left-right direction, which correspond to plural vehicle speeds and plural steering angles. In the table shown in FIG. 19B, for example, an inclination angle in the left-right direction is calculated as follows. The vehicle speed acquired from the vehicle speed signal acquired by the vehicle speed acquisition unit is referred to as vehicle speed V. The steering angle acquired from the steering angle signal acquired by the steering angle acquisition unit is referred to as a steering angle S. The inclination angle in the left-right direction, which is to be calculated, is referred to as an inclination angle $\theta$ in the left-right direction. To begin with, one of the vehicle speeds V11 to V13, which is lower than the vehicle speed V and is closest to the vehicle speed V is referred to as vehicle speed Vc. In the example shown in FIG. 19B, the vehicle speed Vc is the vehicle speed V11. Meanwhile, one of the vehicle speeds V11 to V13, which is higher than the vehicle speed V and is closest to the vehicle speed V is referred to as vehicle speed Vd. In the example shown in FIG. 19B, the vehicle speed Vd is the vehicle speed V12. Subsequently, one of the steering angles S11 to S13, which is smaller than the steering angle S and is closest to the steering angle S is referred to as a steering angle Sc. In the example shown in FIG. 19B, the steering angle Sc is S12. Meanwhile, one of the steering angles S11 to S13, which is larger than the steering angle S and is closest to the steering angle S is referred to as a steering angle Sd. In the example shown in FIG. 19B, the steering angle Sd is S13. The inclination angle at the vehicle speed Vc and the steering angle Sc is referred to as an inclination angle $\theta$c in the left-right direction. In the example shown in FIG. 19B, the inclination angle $\theta$c in the left-right direction is $\theta$21. The inclination angle in the left-right direction at the vehicle speed Vd and the steering angle Sd is referred to as an inclination angle $\theta$d in the left-right direction. In the example shown in FIG. 19B, the inclination angle $\theta$d in the left-right direction is $\theta$32. A difference between the inclination angle $\theta$c in the left-right direction and the inclination angle $\theta$d in the left-right direction is referred to as a difference $\Delta\theta$ between the inclination angles in the left-right direction. The ratio of the difference between the vehicle speed Vc and the vehicle speed V to the difference between the vehicle speed Vd and the vehicle speed V is referred to as Rc. The ratio of the difference between the steering angle Sc and the steering angle S to the difference between the steering angle Sd and the steering angle S is referred to as Rd. The inclination angle $\theta$ in the left-right direction is calculated by adding, to the inclination angle $\theta$c in the left-right direction, a value acquired by multiplying the difference $\Delta\theta$ between the angular speeds in the left-right direction by an average value of Rc and Rd. In the present teaching, the relationship between steering angle, vehicle speed, and inclination angle in the left-right direction may not be indicated by a table. The relationship between steering angle, vehicle speed, and inclination angle in the left-right direction may be represented by a mathematical expression, etc.

In the present teaching, the leaning vehicle may include a brake pedal. In the present teaching, as the driver operates the brake pedal, the rear brake may be activated. In the present teaching, the rear brake may be activated by the brake pedal, the left brake lever, or the rear brake driving unit. In the present teaching, the leaning vehicle may include a brake pedal but not include a left brake lever. In the present teaching, the rear brake may be activated by the brake pedal or the rear brake driving unit. In the present teaching, the leaning vehicle may not include a left brake lever and a brake pedal. In the present teaching, the rear brake or the front brake may be activated as the driver operates a right brake lever. In the present teaching, the right brake lever and the left brake lever may be indirectly connected to each other. In the present teaching, the rear brake and the front brake may be activated as the driver operates the right brake lever and the left brake lever.

In the present teaching, the leaning vehicle of the riding simulator of the leaning vehicle may include a brake pedal. In the present teaching, the angular speed acquisition device for acquiring angular speed about the road surface perpendicular axis of the leaning vehicle may acquire a signal related to an operation amount of the brake pedal operated by the driver as a vehicle speed signal, and calculate a virtual rear brake of the leaning vehicle. In the present teaching, the leaning vehicle of the riding simulator of the leaning vehicle may include a left brake lever and a brake pedal. In the present teaching, the angular speed acquisition device for acquiring angular speed about the road surface perpendicular axis of the leaning vehicle may acquire a signal related to an operation amount of the right brake lever operated by the driver as a vehicle speed signal, and calculate a virtual rear brake and a virtual front brake. In the present teaching, the leaning vehicle of the riding simulator of the leaning vehicle may be arranged such that the right brake lever and the left brake lever are indirectly connected to each other. In the present teaching, the angular speed acquisition device for acquiring angular speed about the road surface perpendicular axis of the leaning vehicle may acquire a signal related to an operation amount of the right brake lever or the left brake lever operated by the driver as a vehicle speed signal, and calculate a virtual rear brake and a virtual front brake.

In the present teaching, the transmission of the leaning vehicle may have a clutch. The clutch is switchable between a connection state in which driving force output from the engine main body is transmitted to the rear wheel unit and a cut-off state in which the driving force output from the engine main body is not transmitted to the rear wheel unit. In the present teaching, the leaning vehicle may have a clutch lever at a location in front of the left grip. In the present teaching, the driver may activate the clutch by operating the clutch lever. In the present teaching, the transmission of the leaning vehicle may be a centrifugal clutch. When the leaning vehicle includes a centrifugal clutch, the leaning vehicle may not include a clutch lever. A signal related to an amount of operation of the clutch lever by the driver may be acquired by a vehicle speed signal, and the clutch may be calculated.

In the present teaching, the leaning vehicle of the simulator of the leaning vehicle may include a virtual clutch. The virtual clutch is used for a kinetic model in the vehicle front-rear direction of the motorcycle 1, which is stored in advance. In the present teaching, the leaning vehicle of the riding simulator of the leaning vehicle may include a clutch lever provided in front of the left grip. In this case, in the present teaching, the angular speed acquisition device for acquiring angular speed about the road surface perpendicular axis of the leaning vehicle may acquire a signal related to an operation amount of the clutch lever operated by the driver as a vehicle speed signal, and calculate a virtual clutch. Furthermore, in the present teaching, the leaning vehicle of the riding simulator of the leaning vehicle may include a virtual centrifugal clutch. When the leaning vehicle of the riding simulator of the leaning vehicle include the virtual centrifugal clutch, the leaning vehicle may not include a clutch lever. In this case, in the present teaching, the angular speed acquisition device for acquiring angular speed about the road surface perpendicular axis of the leaning vehicle may acquire a signal related to an operation amount of the centrifugal clutch as a vehicle speed signal, and calculate a virtual clutch.

In the present teaching, the riding simulator of the leaning vehicle may allow the leaning vehicle to move in at least one of the front-rear direction or the up-down direction. In other words, in the present teaching, the riding simulator of the leaning vehicle may allow the leaning vehicle to move within a predetermined range in the front-rear direction. In the present teaching, the riding simulator of the leaning vehicle may allow the leaning vehicle to have at least one of a front suspension or a rear suspension and allow the vehicle body frame to move within a predetermined range in the up-down direction relative to the road surface. It is noted that, in the present teaching, the riding simulator of the leaning vehicle restricts movement in the left-right direction of the leaning vehicle. In other words, in the present teaching, the riding simulator of the leaning vehicle does not allow the leaning vehicle to lean in the left-right direction.

Embodiments of the invention include a motorcycle that does not include the throttle opening degree sensor, the front brake sensor, and the rear brake sensor. Furthermore, a motorcycle according to one embodiment does not include the vehicle speed sensor. In other words, in the present teaching, the motorcycle may acquire vehicle speed by using the throttle opening degree sensor, the front brake sensor, and the rear brake sensor, instead of the vehicle speed sensor. Furthermore, a motorcycle according to one embodiment may not include the wireless communication apparatus.

Embodiments of the invention further include a motorcycle that does not include the throttle valve. An example of an engine unit not including a throttle valve is a diesel engine. The diesel engine is an engine in which output is controlled solely by a fuel injection amount. Another example of an engine unit not including a throttle valve is arranged such that an intake air amount is controlled solely by a lift amount of the intake valve. In such a case, the angular speed acquisition device for acquiring angular speed about the road surface perpendicular axis of the leaning vehicle acquires a signal related to vehicle speed by using an accelerator opening degree sensor instead of the throttle opening degree sensor.

A leaning vehicle according to one embodiment of the invention may not include the engine unit. The leaning vehicle may be an electrically-powered leaning vehicle. In such a case, the angular speed acquisition device for acquiring angular speed about the road surface perpendicular axis of the leaning vehicle acquires a signal related to vehicle speed by using an accelerator opening degree sensor instead of the throttle opening degree sensor.

In the present teaching, the leaning vehicle may be of any type as long as the leaning vehicle includes a vehicle body frame which leans rightward in the vehicle left-right direction when turning right and leans leftward in the vehicle left-right direction when turning left. The leaning vehicle of the present teaching may be a straddled vehicle which is not a motorcycle. A straddled vehicle indicates all types of vehicles on which a driver rides in a manner of straddling a saddle. The leaning vehicle of the present teaching may not be a straddled vehicle. The leaning vehicle of the present teaching may be a tricycle or a four-wheeled vehicle.

What is claimed is:

1. An angular speed acquisition device which is mountable on a leaning vehicle and is configured to acquire an angular speed of the leaning vehicle about a road surface perpendicular axis, the road surface perpendicular axis being an axis perpendicular to a road surface on which the leaning vehicle runs, the leaning vehicle including:
   a vehicle body frame which leans rightward when turning right and leans leftward when turning left;
   a front wheel unit which is supported by the vehicle body frame and includes at least one front wheel;
   a rear wheel unit which is provided behind the front wheel unit in a vehicle front-rear direction, is supported by the vehicle body frame, and includes at least one rear wheel; and
   at least one steering shaft steering the front wheel unit and/or the rear wheel unit, the at least one steering shaft being inserted into the vehicle body frame and being rotatable about a rotational axis thereof, the rotational axis being a leanable rotational axis that leans with the vehicle body frame when the leaning vehicle turns right and left;
the angular speed acquisition device comprising:
   a memory storing a relationship between a steering angle, which is a rotation angle of the at least one steering shaft about the leanable rotational axis thereof, a vehicle speed of the leaning vehicle, and the angular speed about the road surface perpendicular axis; and
   a processor which is configured to, or programmed to, execute:
      (a) a steering angle acquisition process of acquiring a signal related to the steering angle as a steering angle signal;
      (b) a vehicle speed acquisition process of acquiring a signal related to the vehicle speed as a vehicle speed signal; and
      (c) a road surface perpendicular axis angular speed acquisition process of acquiring the angular speed about the road surface perpendicular axis based on the relationship, stored in the memory, between the steering angle, the vehicle speed, and the angular speed about the road surface perpendicular axis, and further based on the steering angle signal and the vehicle speed signal.

2. The angular speed acquisition device according to claim 1, wherein the memory stores the relationship between the steering angle, the vehicle speed, and the angular speed about the road surface perpendicular axis as a table determined by the steering angle and the angular speed about the road surface perpendicular axis, which are acquired when the leaning vehicle runs on circles with different sizes at different constant vehicle speeds.

3. The angular speed acquisition device according to claim 2, wherein the memory is configured to further store a relationship between the steering angle, the vehicle speed, and an inclination angle in a left-right direction, the inclination angle being an angle at which an axis of the vehicle body frame along a vehicle up-down direction is inclined in a vehicle left-right direction relative to a road surface perpendicular direction, and
   the processor is further configured or programmed to execute a left-right direction inclination angle acquisition process of acquiring the inclination angle in the left-right direction based on the relationship between the steering angle, the vehicle speed, and the inclination angle in the left-right direction stored in the memory, the steering angle signal, and the vehicle speed signal.

4. The angular speed acquisition device according to claim 3, wherein the memory stores the relationship between the steering angle, the vehicle speed, and the inclination angle in the left-right direction as a table determined by the steering angle and the inclination angle in the left-right direction, the relationship between the steering angle, the vehicle speed, and the inclination angle having been acquired by running the leaning vehicle in circles with different sizes at different constant vehicle speeds.

5. The angular speed acquisition device according to claim 1, wherein, the memory is configured to further store a relationship between the steering angle, the vehicle speed, and an inclination angle in a left-right direction, the inclination angle being an angle at which an axis of the vehicle body frame is inclined in a vehicle left-right direction relative to a road surface perpendicular direction, and the processor is further configured, or programmed, to execute a left-right direction inclination angle acquisition process of acquiring the inclination angle in the left-right direction based on the relationship, stored in the memory, between the steering angle, the vehicle speed, and the inclination angle in the left-right direction, and further based on the steering angle signal and the vehicle speed signal.

6. The angular speed acquisition device according to claim 5, wherein the memory stores the relationship between the steering angle, the vehicle speed, and the inclination angle in the left-right direction as a table determined by the steering angle and the inclination angle in the left-right direction, the relationship between the steering angle, the vehicle speed, and the inclination angle having been acquired by running the leaning vehicle in circles with different sizes at different constant vehicle speeds.

7. The angular speed acquisition device according to claim 1, wherein the leaning vehicle is a riding simulator of a wheeled leaning vehicle.

\* \* \* \* \*